United States Patent
Gravenites et al.

(10) Patent No.: US 10,628,237 B2
(45) Date of Patent: Apr. 21, 2020

(54) CLOUD SERVICE INTEGRATION FLOW

(71) Applicant: Oracle International Corporation, Redwood Shores, CA (US)

(72) Inventors: Greg Gravenites, Littleton, CO (US); Rajan Mahendrakumar Modi, Highlands Ranch, CO (US); Colin Harsh, Centennial, CO (US); Andy Van Hoesen, Thornton, CO (US); Arif Rafique, Parker, CO (US); Ansuman Padhy, Bengaluru (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 81 days.

(21) Appl. No.: 15/705,901

(22) Filed: Sep. 15, 2017

(65) Prior Publication Data

US 2018/0081739 A1 Mar. 22, 2018

Related U.S. Application Data

(60) Provisional application No. 62/396,064, filed on Sep. 16, 2016, provisional application No. 62/510,979, filed on May 25, 2017.

(30) Foreign Application Priority Data

Sep. 16, 2016 (IN) .............................. 201641031590

(51) Int. Cl.
*G06F 9/54* (2006.01)
*G06F 9/50* (2006.01)
(Continued)

(52) U.S. Cl.
CPC .............. *G06F 9/54* (2013.01); *G06F 9/5077* (2013.01); *G06F 16/2358* (2019.01);
(Continued)

(58) Field of Classification Search
CPC ....................................................... G06F 9/542
(Continued)

(56) References Cited

U.S. PATENT DOCUMENTS 6,208,345 B1 3/2001 Sheard et al.
6,738,975 B1 * 5/2004 Yee ......................... G06F 9/541
719/310
(Continued)

FOREIGN PATENT DOCUMENTS

WO 2002/21314 A2 3/2002
WO 2006/026686 A1 3/2006

OTHER PUBLICATIONS

Wang et al., 'Change impact analysis in service-based business processes', Service Oriented Computing and Applications (2012) 6:11-149.
(Continued)

*Primary Examiner* — Andy Ho
(74) *Attorney, Agent, or Firm* — Kilpatrick Townsend & Stockton LLP

(57) ABSTRACT

Techniques are disclosed for identifying, applying and validating changes to activities in an integration flow. A user may make a change to an activity in an integration flow. Other activities in the integration flow may be affected because of the change. Any activities that are affected by the change are identified and changes are made to the affected activities so that the integration flow can operate correctly. After the changes are made, the activities are validated to ensure that the changes made are consistent with the integration flow.

20 Claims, 19 Drawing Sheets

(51) Int. Cl.
*G06F 16/23* (2019.01)
*H04L 12/24* (2006.01)
*G06F 16/25* (2019.01)
*H04L 12/26* (2006.01)
*H04L 29/08* (2006.01)

(52) U.S. Cl.
CPC .......... *G06F 16/25* (2019.01); *H04L 41/0856* (2013.01); *H04L 41/0869* (2013.01); *H04L 41/50* (2013.01); *H04L 43/08* (2013.01); *H04L 67/26* (2013.01); *H04L 41/0816* (2013.01); *H04L 67/10* (2013.01)

(58) Field of Classification Search
USPC .......................................................... 719/318
See application file for complete search history.

(56) References Cited

U.S. PATENT DOCUMENTS

| | | | |
|---|---|---|---|
| 7,174,370 B1 | 2/2007 | Saini et al. | |
| 7,496,887 B2 | 2/2009 | Grasselt et al. | |
| 7,844,911 B2 | 11/2010 | Austin et al. | |
| 8,332,806 B2 * | 12/2012 | Patrascu | G06F 8/20 717/100 |
| 8,413,115 B1 | 4/2013 | Surprise et al. | |
| 8,683,443 B2 * | 3/2014 | Hatton | G06F 8/71 717/124 |
| 2004/0044986 A1 | 3/2004 | Kompalli et al. | |
| 2006/0053408 A1 | 3/2006 | Kornerup et al. | |
| 2007/0044072 A1 | 2/2007 | Hayles | |
| 2008/0059436 A1 | 3/2008 | Crocker | |
| 2008/0270977 A1 | 10/2008 | Nucci et al. | |
| 2009/0132506 A1 | 5/2009 | Houck et al. | |
| 2010/0011309 A1 | 1/2010 | Mitra et al. | |
| 2011/0161920 A1 | 6/2011 | Alexander et al. | |
| 2011/0191753 A1 | 8/2011 | Ghercioiu et al. | |
| 2011/0246961 A1 | 10/2011 | Tripathi | |
| 2013/0093771 A1 | 4/2013 | Simitsis et al. | |
| 2013/0166963 A1 * | 6/2013 | Stoyanov | G06F 11/0709 714/48 |
| 2013/0290980 A1 | 10/2013 | Kemp et al. | |
| 2014/0240754 A1 | 8/2014 | Smyth et al. | |
| 2014/0282364 A1 | 9/2014 | Woodward | |
| 2016/0182652 A1 | 6/2016 | Bevilacqua et al. | |
| 2016/0359689 A1 | 12/2016 | Herreria et al. | |
| 2016/0378274 A1 | 12/2016 | Akiner et al. | |
| 2017/0257429 A1 * | 9/2017 | Hosie | H04L 67/1008 |
| 2018/0081643 A1 | 3/2018 | Gravenites et al. | |
| 2018/0081895 A1 | 3/2018 | Kendai et al. | |

OTHER PUBLICATIONS

Danila et al., Change Impact Analysis in WS-BPEL Processes U.P.B. Sci. Bull., (2015) Series C, 77:2.
"Authoring SharePoint Workflows in Visual Studio 2005", Available online at https://msdn.microsoft.com/en-us/library/office/aa830816(v=office.12).aspx#office2007ssintrotoworkflows_authsharepointworkflowsinvs2005, 2005, 3 pages.
"Building a Workflow—Drip Knowledge Base", Available online at http://kb.getdrip.com/email-automation/workflows/building-a-workflow/, accessed from internet on May 10, 2017, 10 pages.
"Hybrid Integration Platform for Cloud, SaaS & IoT, World's first Microservices business process orchestrator", Robomq.io, Available online at https://www.robomq.io/, 2017, 17 pages.
"Integration Flow Designer", Available online at https://www.robomq.io/products/flow.html, 2017, 8 pages.
"SAP Cloud Platform Integration", Available online at https://cloudplatform.sap.com/capabilities/integration/cloud-integration.html#, accessed from internet on May 9, 2017, 6 pages.
Introducing Visual Workflows, Simple Marketing Automation Workflows by Drip, Available online at https://www.drip.co/workflows, May 2017, 6 pages.
U.S. Appl. No. 15/706,269, Notice of Allowance dated Oct. 31, 2018, 10 pages.

* cited by examiner

CLOUD SERVICE INTEGRATION FLOW

CROSS REFERENCE TO RELATED APPLICATIONS

This application claims priority to U.S. Provisional Patent Application No. 62/396,064 filed on Sep. 16, 2016 in the United States Patent and Trademark Office, entitled "CLOUD SERVICE ORCHESTRATION," Indian Provisional Application No. 201641031590 filed on Sep. 16, 2016, in the Indian Patent Office, entitled "CLOUD SERVICE NOTIFICATIONS," and U.S. Provisional Patent Application No. 62/510,979 filed on May 25, 2017 in the United States Patent and Trademark Office, entitled "INTEGRATION CLOUD SERVICE," the disclosures of which are incorporated by reference herein in their entirety.

BACKGROUND

Example embodiments are related to the field of application integration and more specifically to methods, devices, systems and computer readable media for the generation of an integration flow.

A user may have one or more applications that they would like to integrate. Data in the first application may be used by a second application. Therefore, the first application can be integrated with the second application. For example, a human resources application may be integrated with a marketing application so that the marketing application can use the customer records in the human resources application.

However, integrating data between applications can be a laborious and tedious process. It can also be difficult to determine whether the data was correctly integrated. If the integration is not performed correctly, the data provided to, for example, the second application may not be accurate or up-to-date. Further, if the integration is not performed correctly, desired data may not be accessible to the second application or may be incorrectly sent to the second application.

It is often difficult to identify the source of the problem. Further, it is difficult to identify what aspects of the integration require correction. Therefore, it can be costly to repair an integration. Also, it can be time-consuming to identify the source of the integration problem and correct the integration.

BRIEF SUMMARY

Applications may be integrated or combined so that, for example, data between applications can be shared. Different types of application, including on-premise and cloud applications, may be integrated by an integration cloud service system. The applications may be in a cloud environment or may be on-premise at a location of the application provider. By integrating applications, a user may be able to perform desired functions more quickly and efficiently.

An integration in an integration cloud service system can be defined by a number of artifacts including a flow definition and supporting artifacts, such as Web Services Description Language (WSDLs), J2EE Connector Architecture (JCA) files and XML Schema Definitions (XSDs). These artifacts form can integration cloud service project which can be a base unit in terms of development, implementation, activation and import/export.

In order to integrate data from a first application to a second application, an integration flow can be created. Through an integration flow, data from a first application can be made to be compatible with a second application. An integration flow can also be called an integration, a flow, or an orchestration. In order to integrate applications, an integration flow can be created that specifies how data in the first application is to be integrated or combined with the second application so that the data from the first application can be used by the second application. Therefore, an integration flow is a flow of data from one system to another system.

An integration flow can be one artifact that is contained within the project. In an embodiment, an integration cloud service project can include at most a single integration flow. In alternative embodiments, an integration cloud service project can include a plurality of integration flows that together compose a single integration.

An integration flow can be created which identifies one or more data sources and actions to be performed on the data. An integration flow allows an integration to be configured such that a source payload can be inspected and decisions can be made as to whether the payload should be delivered to the configured target or if data should be sent conditionally to a different configured target. For example, an integration flow can include one source application, one or more actions and one or more target applications. The source application, target application and actions in the integration flow can generally be called activities of an integration flow. In an example embodiment, there can be a single source application or there can be more than one source application. The source application can also be known as trigger and the target or destination application can also be known as an invoke. The actions can identify, for example, actions that are to be applied to particular data from the source application so that the data can be integrated with the target application.

The one or more source applications, target applications, and actions can be known as activities. The activities can be identified as nodes or elements of an integration flow. A plurality of nodes (e.g., source application, target application, action) can make up an integration flow. Further, a plurality of nodes may make up a single activity. That is, one node can correspond to one activity or a plurality of nodes can correspond to one activity. The source application can be an application for a first type of system and the target application can also be an application for the first type of system. Alternatively, the source application can be an application for a first type of system and the target application can be an application for a second system that is different from the first type of system.

Further, an integration flow can include several different source applications and several different target applications. The source and target applications can occur throughout the integration flow. One or more applications can be placed between the first application (e.g., source application) and the second application (e.g., target application). In an integration flow, there can be applications that are placed between the source application and the target application. The target application can be an application that will respond to a message that is generated by the source application. A source application can generate a message if, for example, the source application would like to make a request to an integration system. A request can be directed to, for example, a change to a data parameters of the source application. Although the example described is with respect to a source application other elements in the integration flow may generate a message.

The source application may be, for example, a human resources application that formats an employee record by "first name, last name." The target application may be, for example, a new version of the human resources application that format an employee record by "last name, first name." An integration flow can be created that applies an action to the records in the source application so that the data in the record will be compatible with the target application.

However, the user may decide to change a parameter in one of the nodes. For example, the user may change a parameter in the source application. However, changing a parameter in, for example, the source application may adversely affect other activities such as the actions or target application.

Example embodiments provide for applying changes to an activity of an integration flow and automatically propagating the impact of those changes to other activities in the integration flow. All of the activities will be made aware of the change. Propagating the impact of the changes to other activities in the integration flow can result in additional changes. A change in one activity may require a change in another activity. That is, a continuous set of changes may be performed. One or more activities may be modified to address the change in the earlier activity.

An example embodiment can automatically update all of the changes needed for all of the activities in an integration flow. Alternatively, an example embodiment can provide a user with a notification regarding a status of the change (e.g., if the change is invalid) and that correction by the user is required.

The example embodiment can be performed during design time. During design time, a user can actively make changes to the integration flow as a whole, or can make changes to parameters of activities in the integration flow. Therefore, before the integration is deployed (e.g., before runtime), the activities in the integration flow have been validated ensuring a properly functioning integration. Issues are identified and resolved during the design stage as opposed to having to deploy the integration in a runtime environment and then testing and verifying the integration flow during run time. That is, the impact of a change will be assessed during design time.

The foregoing, together with other features and embodiments will become more apparent upon referring to the following specification, claims, and accompanying drawings.

BRIEF DESCRIPTION OF THE DRAWINGS

The disclosure will be readily understood by the following detailed description in conjunction with the accompanying drawings, wherein like reference numerals designate like elements, and in which.

DETAILED DESCRIPTION

Figure 1:
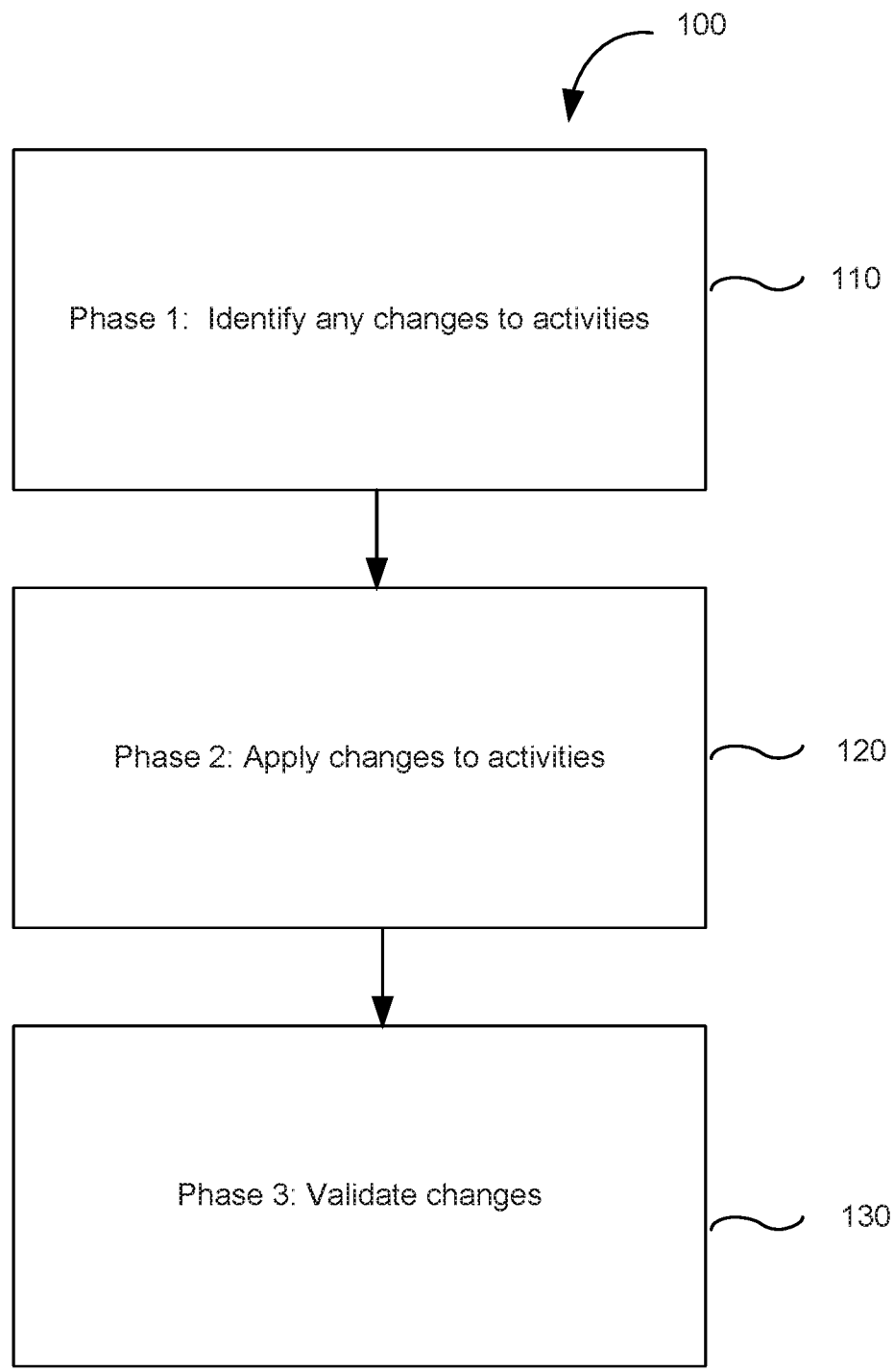
FIG. 1 illustrates a flowchart of a method for identifying, applying and validating changes to an integration flow of an integration system, in accordance with an example embodiment.

In the following description, for the purposes of explanation, specific details are set forth in order to provide a thorough understanding of example embodiments. However, it will be apparent that various embodiments may be practiced without these specific details. For example, systems, algorithms, structures, techniques, networks, processes, and other components may be shown as components in block diagram form in order not to obscure the embodiments in unnecessary detail. The figures and description are not intended to be restrictive.

A user may want to integrate applications. A user can be an integration developer, an end user, or any user of the integration system. An integration system can be used to integrate applications. For example, a user may want to integrate a human resources application with a marketing application. The resources application may include customer data and the marketing application may include marketing data. The data can be stored in records in the applications. If the user wants to send marketing data to customers in the human resources application, the human resources application can be integrated with the marketing application. This is merely an example, and various types of applications can be integrated. Further, an integration may involve integrating many applications and there are various reasons for integrating applications.

However, data from a source application may not initially be compatible with data from a target application. Data in the source application may be in a format that is different from data in the target application. For example, with the human resources application, customer information may be stored in a single field. For example, "first name, middle name, last name" of a customer may be stored in a single field of a record in the human resources application. A second application may store customer information as three separate fields. For example, "first name," "middle name," and "last name" of a customer may each be stored in three separate field in the second application.

In order to change the client information format from a single field to three separate fields, an integration flow can be created which identifies activities so that the data in the first application can be compatible with data in the second application. When the integration flow is valid and applied, data from the source application can be compatible with the destination application.

Data can be made compatible by for example, changing a type of the data or a format of the data. An activity can include a source application, a target application, and an action to be performed on data. An integration flow can include one or more activities. Specifically, an integration flow can include one source application, one or more target application and one or more actions to be performed on data between a source application and a target application. The activity can include parameters indicating how data in the source application is modified so as to be compatible with the target application.

In order to integrate the source application with the target application actions can be applied to data in the source application order to make it compatible with the target application. Actions can include the following:

Assign: Enables user to assign variables in integrations.

Callback: Enables user to end a process and return to the trigger. For example, user can add a switch action and define a branch in which user can add a Callback. If some defined expression logic is not met, this branch is taken. The integration is stopped and the trigger receives a response indicating that the integration is not continuing.

Fault Return: Enables user to return a fault.

For Each: Enables user to loop over a repeating element and execute one or more actions within the scope of the for-each action.

Function Call: Enables user to add JavaScript functions to the integration.

Logger: Enables user to add log messages to the activity stream and diagnostic logs. The integration flow can show a user how to log a message using the logging action. The logging action logs whatever is happing into a logger. It can take a message and log it into a logger.

Map: Enables user to add ad-hoc mappers to the integration. The integration flow can show a user how to map a message that is coming in and how to map it to the response. With a mapping action a user can configure the map and the map can indicate how data in the source application is mapped to the target application. for example, in the map, the can identify a first value in for example a record in the source application and where it should be located in a record in the target application. as another example, a record in the source application may store an employee record by "first name, middle name, and last name" all in a single field. A target application may store an employee record by "last name," in one field and then "first name, middle name" in a second filed. therefore, the map can indicate how to convert the employee record in the first application from "first name, middle name, and last name" all in a single field to "last name," in one field and then "first name, middle name" in another field. The mapping can be performed through Extensible Stylesheet Language Transformations (XSLT).

Notification: Enables user to send a notification to relevant users at specific points in the execution of an integration. The notification can be, for example, an email.

Raise Error: Enables user to send failed messages to the error hospital for further analysis.

Return: Enables user to return an immediate response.

Scope: Enables user to manage a collection of child actions and invokes that can have their own fault handlers.

Stage File: Enables user to process files in scheduled integrations.

Switch: Enables user to add a switch action for defining routing expression branches in the integration. A switch can also be called a router.

Stop: Enables user to terminate the integration. No response message is returned to the trigger.

Wait: Enables user to delay the execution of an integration for a specified period of time.

While: Enables user to loop over actions or invoke connections as long as a specific condition is met.

The above are merely examples of actions and other actions than those described above can be performed in an integration flow.

Changes made to a previously defined action may negatively impact other activities. For example, modifying an activity can adversely affect other activities that use the same data. A change to an activity can render an integration flow incorrect, invalid or incomplete.

I. Integration Flow Modification

FIG. 1 illustrates a flowchart of a method for identifying, applying and validating changes to an integration flow in an integration system, in accordance with some example embodiments.

The method for applying and validating changes to an integration flow 100 can be performed in three phases or passes. The method can be performed in an integration system, such as an integration cloud service system. The activities are activities that are in an integration flow which is been created by a user.

In the first phase 110, all the of activities that are affected by a change in an activity are identified. The first phase 110 can be also be known as the change determination phase. The first phase 110 can include identifying changes that may affect other activities in the integration flow. If, for example, there is a request to make a change, the change is broadcast so that other activities in the integration flow receive the information in the request and determine whether they need to be changed as well.

The first phase 110 can operate continuously until it is determined that no other changes need to be made. Each activity that changes can then broadcast its change to the other nodes in the integration flow. This process can be formed continuously until no nodes are broadcasting a change to itself. Therefore, the broadcasting will be performed continuously until no node broadcasts a change to itself.

The first phase traverses the integration flow in a specified order to identify the activities impacted either directly or indirectly by the change being made. The order of traversal is important in order to identify activities indirectly impacted within a single pass. No changes to the integration flow are made during the first phase 110.

After the first phase 110 is performed, all of the activities that should be changed have been identified. After first phase 110, all of the activities in the integration flow are aware of the changes required for all of the other activities in the integration flow. In the second phase 120, the changes are applied to the activities that were identified in the first phase 110. The second phase 120 can also be known as the change application phase.

If there is a change in the type of input to an activity, the activity will change the input so that it will conform to the new type of input. The second phase 120 can include applying the changes to the activities that are identified in first phase 110.

Second phase 120 applies the necessary changes by updating all the impacted activities. The second phase 120 is performed in an orderly fashion so as to maintain the integrity of the integration flow. During the second phase 120, each activity that is affected by the change is modified so as to be compatible with the change. That is, each affected activity is modified so that it can perform its role in the integration flow correctly. During the second phase 120, each activity that is affected can also register itself for subsequent validation. The second phase 120 is completed when the changes identified in first phase 110 have been applied to all of the activities.

At the end of the second phase 120, all of the activities have been updated so that they conform with the initial and subsequent changes. All of the changes are applied to the integration flow.

In the third phase 130, the changes to the activities are validated and the integration flow as a whole is validated. The third phase 130 can also be known as the validation phase.

The changes made in step 120 are validated to ensure that the integration flow is operating correctly. During the validation phase, it will be determined whether all of the activities are valid. That is, whether or not there are any errors or warnings for any of the activities in response to making the change. For example, an error or warning may appear next to an activity indicating that the change has affected an activity and the activity may not work properly.

The third and final phase is to validate the now updated integration flow. Activities registered during phase two for subsequent validation are now individually validated in the context of the fully updated integration. Validation may result in zero or more warnings or errors per activity. Each activity can validate itself to determine whether or not there are any errors or warnings for the activity.

After the validation is performed by each of the activities in the integration system, the integration flow as a whole can also be validated.

Figure 2:
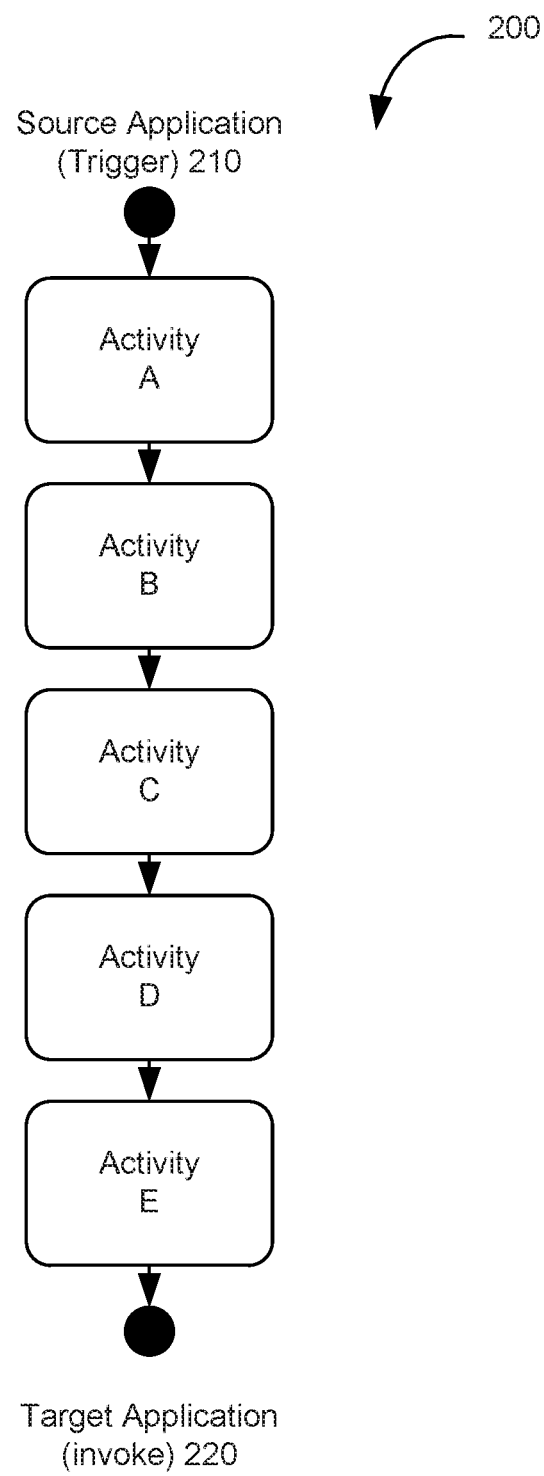
FIG. 2 illustrates a general overview of an integration flow, in accordance with an example embodiment.

FIG. 2 illustrates a general overview of an integration flow, in accordance with some example embodiments. The example shown in FIG. 2 is described with respect to method 100 of FIG. 1 and the integration system 300 of FIG. 3.

An integration flow is shown in FIG. 2. As shown in FIG. 2, the integration flow 200 includes a source application 210 and a target application 220. In the example shown in FIG. 2, five action activities (A, B, C, D, and E) are performed. Activities A, B, C, D, and E can be called action activities whereas source application and target application are application activities. All of the activities (e.g., source application 210, a target application 220, and activities A, B, C, D, and E) are represented as nodes in the integration flow.

The source application 210 can be a first application and the target application 201 can be a second application that is different from the first application. The source application can also be called the trigger, trigger application, source activity, or trigger activity. The source application initiates a request to the integration system. The target application can also be called the destination application, invoke, invoke application, target activity or invoke activity.

The activities A, B, C, D, and E can be any of the activities that were described above. Activities A, B, C, D, and E are action activities since they can include actions that are applied to the source application 210 and the target application 220. For example, activities A, B, C, D, and E can include any one or more of Assign, Callback, Fault Return, For Each, Function Call, Logger, Map, Notification, Raise Error, Return, Scope, Stage File, Switch, Stop, Wait, and While.

In order to integrate source application 210 with target application 220, activity A, activity B, activity C, activity D and activity E can be performed.

The integration of the source application 210 and the target application 220 can be performed through an integration cloud service system. Further, the activities that are used in the integration flow can be selected by a user using the integration cloud service system.

The integration flow 200 is sequential. However, this is merely an example and an integration flow may not be sequential, as shown in the examples below. The integration flow shown in FIG. 2 is merely an example integration flow and is used for ease in describing the example embodiments. An integration flow can include fewer or more activities then that shown in FIG. 2. Further, an integration flow can have many branches and may not be sequential.

Integration flow 200 is sequential since activity E is dependent on the output of activity D, activity D is dependent on the output of activity C, activity C is dependent on the output of activity B, and activity B is dependent on the output of activity A. Further, activities may be dependent on inputs for other activities. For example, activity A can be dependent on the input of activity B and activity B can be dependent on the input of activity C. Activities A, B, C, D, and E correspond to, for example, actions that can be applied to data in source application 210, so that the data in source application 210 will be compatible with target application 220.

Activities in an integration flow indicate actions that are to be performed based on a message that is generated in response to a request to make a change to the integration. In response to the request (e.g., a change to data), the request will be broadcast to all of the nodes in the integration flow. The nodes in the integration flow will determine how to address the request so that the activity in the integration flow will address the request correctly (first phase). All of the other nodes will assess the impact of the request on itself. For example, in response to the change in activity C, activity D will assess the impact of the change to activity D, activity E will assess the impact to activity E, and so on. Each of the nodes in the integration flow can independently determine how the change affects their operation.

A change in one of the activities can adversely affect another activity that is dependent on the earlier activity. For example, a change in activity C can adversely affect activity D and/or activity E. For example, activity C can be an invoke activity. Activity C may originally have been invoke service 1, however, the user may change activity C to invoke service 2. Since the user has made a change to a parameter of the activity, the integration system will then determine whether the change is consistent with the integration flow or whether the change will adversely affect the integration flow.

Each activity can independently assess the impact of the activity on itself. The activities will analyze the broadcast and can identify whether the activity needs to change or not.

In accordance with some example embodiments, changes to an integration flow are managed so that the integration flow will operate correctly. For example, anything downstream of a change will affect activities that are dependent on the activity that is changed. The first phase can operate continuously until no activities in the integration flow are broadcasting a change.

After the first phase is performed, each of the activities will apply the changes to itself (second phase). If the change to activity C results in a change to activity D and activity E, then in the second phase, activity D and activity E will apply any necessary changes to themselves. For example, if an input parameter is changed in activity C, and activity D and activity E use the input parameter from activity C, then the corresponding input parameter for activity D and the corresponding input parameter for activity E are updated. For example, each activity will know its required inputs and outputs. If the change that is identified in the request is contrary to an input and output of an activity, then it can notify the user that a change is required After the changes have been applied to all affected activities, each of the activities are validated (third phase). It is determined whether the affected activity is functioning properly. For example, activity D and activity E can validate themselves to determine whether they are operating correctly. If the activity is not operating correctly, then an error or warning can appear next to the activity is further described below.

After each activity is validated, the integration flow as a whole can also be validated. The validation of the integration flow as a whole can be part of the validation phase (third phase), or it can be a separate phase. For example, the user may not want to validate the integration flow as a whole.

Figure 3:
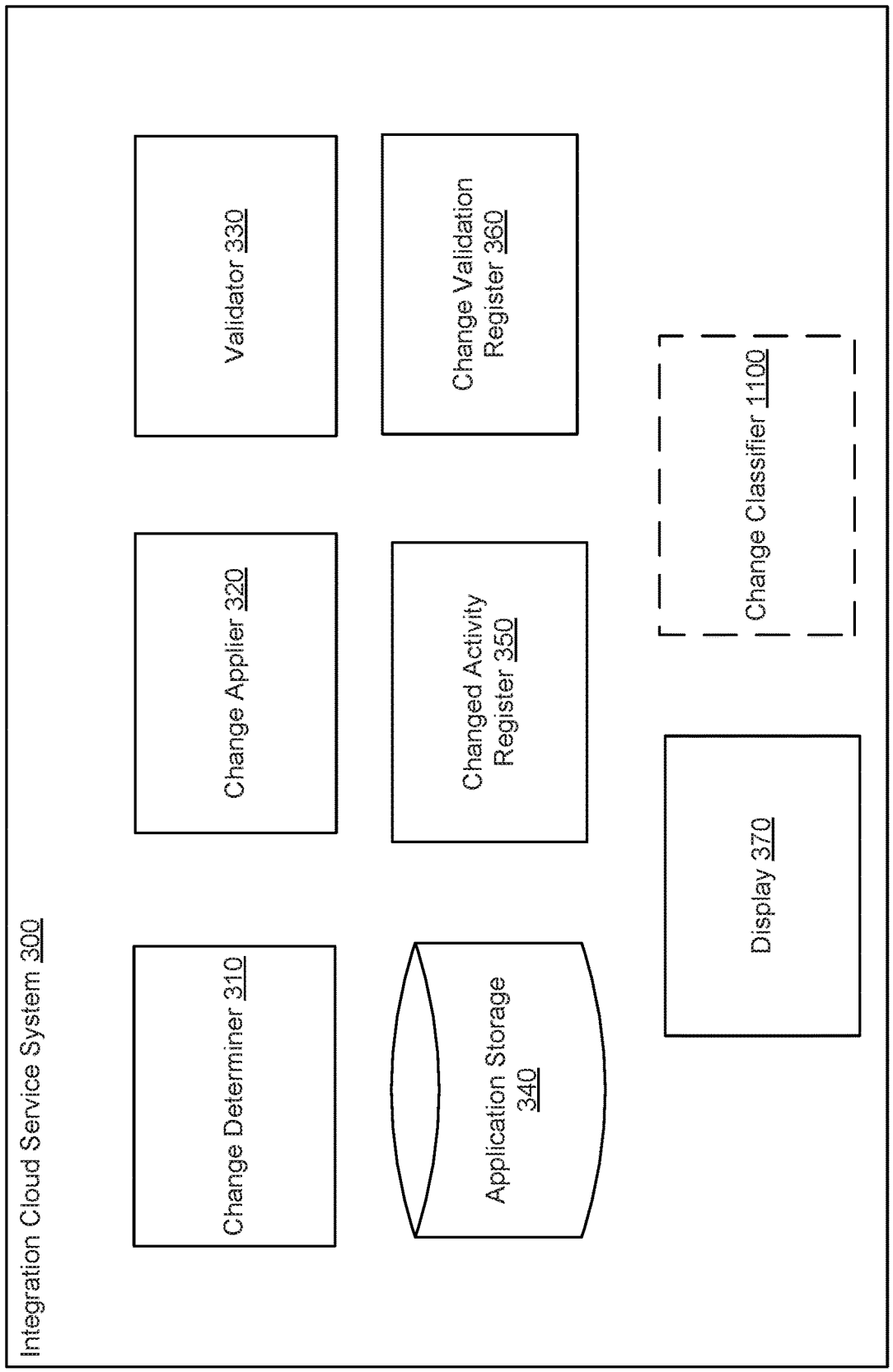
FIG. 3 illustrates a block diagram of a system for applying and validating changes to an integration flow, in accordance with some example embodiments.

FIG. 3 illustrates a block diagram of a system for identifying, applying and validating changes to an integration flow, in accordance with some example embodiments.

An integration system 300, in accordance with example embodiments, simplifies the creation of an integration flow. An integration system can also be called an integration cloud service system. A user with minimal technical knowledge can build up a very complex integration flow in order to integrate applications. The integration system can be an integration platform that operates in a cloud environment. The one or more source applications and the one or more target applications may be stored in the cloud or may be stored on-premise at one or more physical locations.

The integration cloud service system 300 can include change determiner 310, a change applier 320, validator 330, application storage 340, changed activity register 350, change validation register 360, display 370, and change classifier 1100.

Change determiner 310 can perform the change determination phase (first phase), the change applier 320 can perform the change application phase (second phase), and validator 330 can perform the validation phase (third phase), application storage 340, changed activity register 350, change validation register 360, display 370 and change classifier 1100.

Application storage 340 can store information related to applications. If the application is stored somewhere in a cloud or in an on-premise location, information regarding accessing the application can be stored in the application storage 340. The application information stored in application storage 340 can correspond to applications that are currently used in an integration flow or can correspond to applications that are accessible by the integration system 300.

Changed activity register 350 is a register of activities that are affected by a change to an activity and therefore should be updated. For example, in the example shown in FIG. 2, since the change to activity C requires a change to activity D and activity E, the changes for activity D and activity E are registered in the changed activity register 350. Therefore, the activities that need to be updated in response to an initial request, can be easily identified since they are registered in the changed activity register 350.

Change validation register 360 is a register of activities to be validated. After a change has been applied to an activity, the activity can indicate whether they would like the applied change to be validated. During the validation phase, the validator 330 can validate the changes that are registered in the change validation register 360.

The change classifier can classify the changes to an activity and will be explained in greater detail with respect to FIG. 11. The display 370 can display information to a user. For example, errors or warnings with respect to an integration flow can be provided to a user via the display 370.

Figure 4:
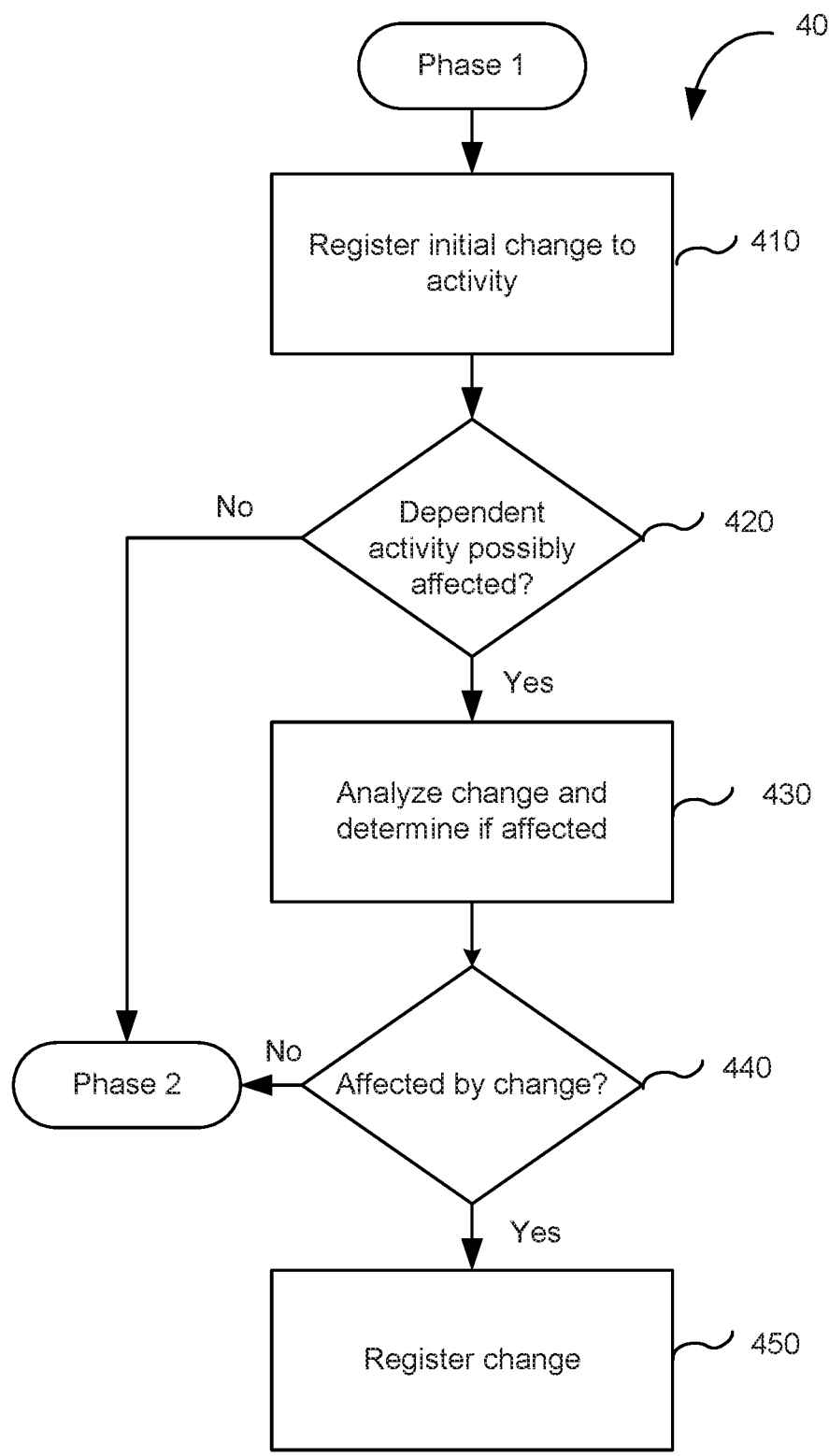
FIG. 4 illustrates a flowchart of a change determination phase, in accordance with some example embodiments.

FIG. 4 is a flow diagram of a change determination phase 400, in accordance with some example embodiments.

In the integration flow shown in FIG. 2, if a user modifies, for example, an input of activity C, activity A and activity B may be affected due to possible dependencies on the input of activity C. Alternatively, if the user modifies the output of activity C, then activity D and activity E may be affected. In addition, it is also possible that a change to an output of activity C can affect activity D which in-turn will affect activity E. That is, a change to C has a direct impact on D and an indirect impact on E. There are a number of possibilities in what may or may not be affected by a change to an activity.

If, for example, a user has modified Activity C such that its output will differ from the previously defined output this can affect other activities. For example, a type of desired output may be changed. For purposes of explanation, modifications were not made to the input of activity C. Since activity D is dependent on activity C and activity E is dependent on the output of activity D, the change to the output of activity C can have a direct impact on activity D and can have an indirect impact on E. The change initiated by the end-use results is the following processing sequence.

At step 410, a change to an activity (e.g., changed activity) is registered. The change to the activity can be registered in the changed activity register 350. In the integration flow shown in FIG. 2, activity C can register a pending change regarding an output of activity C. For example, a user may want to change a type of the output of activity C. The change can be registered in the changed activity register 350.

At step 420, it is determined whether a dependent activity can be affected by the change at step 410. If an activity in the integration flow will not be affected by the change, then the method can proceed to the second phase The determination can be performed by the change determiner 310. For each of the activities in the integration flow, it is determined whether they are affected by the change. In order to determine whether an activity is affected by a change, the activities are traversed in a depth first sequence. The determination can be performed sequentially since an integration flow is sequential.

If the change to an activity (e.g., change to activity C) could affect a dependent activity (e.g., activity D), then at step 430 the change to the activity is analyzed and it is determined if the activity is affected by the registered change. Activity D can analyze all the pending changes that have been registered up to this point and can determines whether it is affected by any of the changes.

If, at step 440, it is determined that the activity is not affected by the change, then the method can proceed to phase 2, the change application phase, at step 460. If at step 440 it is determined that an activity (e.g., activity D) is affected by the change, then at step 450 the change to the dependent activity (e.g., activity D) is registered. The change to the activity can be registered in the changed activity register 350.

In this example, activity D determines that the pending change to the output of activity C will affect the output of activity D. Therefore, activity D will register a pending change to its output. After the change is registered, the process is repeated (e.g., for activity E, A, and B) until there are no further dependent activities that could possibly be affected by the changed activity.

For example, activity E can analyzes all the pending changes that have been registered up to this point and can determine whether it is impacted by any of them, determines that it is not impacted by the pending change to C's output, and/or determine that the pending change to D's output will impact its own internal configuration. Because the impact is internal it does not need to register a pending change (i.e. other activities are not impacted by the change to Activity E). However, if other activities can be affected by the change, then the change can be registered.

Activity A analyzes all the pending changes that have been registered up to this point and determines whether it is impacted by any of them. In the example shown in FIG. 2, activity A determines that it is not impacted. If, for example, the change to Activity C included a change to an input of activity A, then activity A may have been impacted.

Activity B analyzes all the pending changes that have been registered up to this point and determines whether it is impacted by any of them. In the example shown in FIG. 2, activity B determines that it is not impacted. If, for example, the change to Activity C included a change to an input of activity B, then activity B may have been impacted. Also, activity B may have been impacted if Activity A had been impacted.

Therefore, the change determination phase (phase 1), all of the activities that are affected, and the specific aspects of the activities that are affected, are identified.

Figure 5:
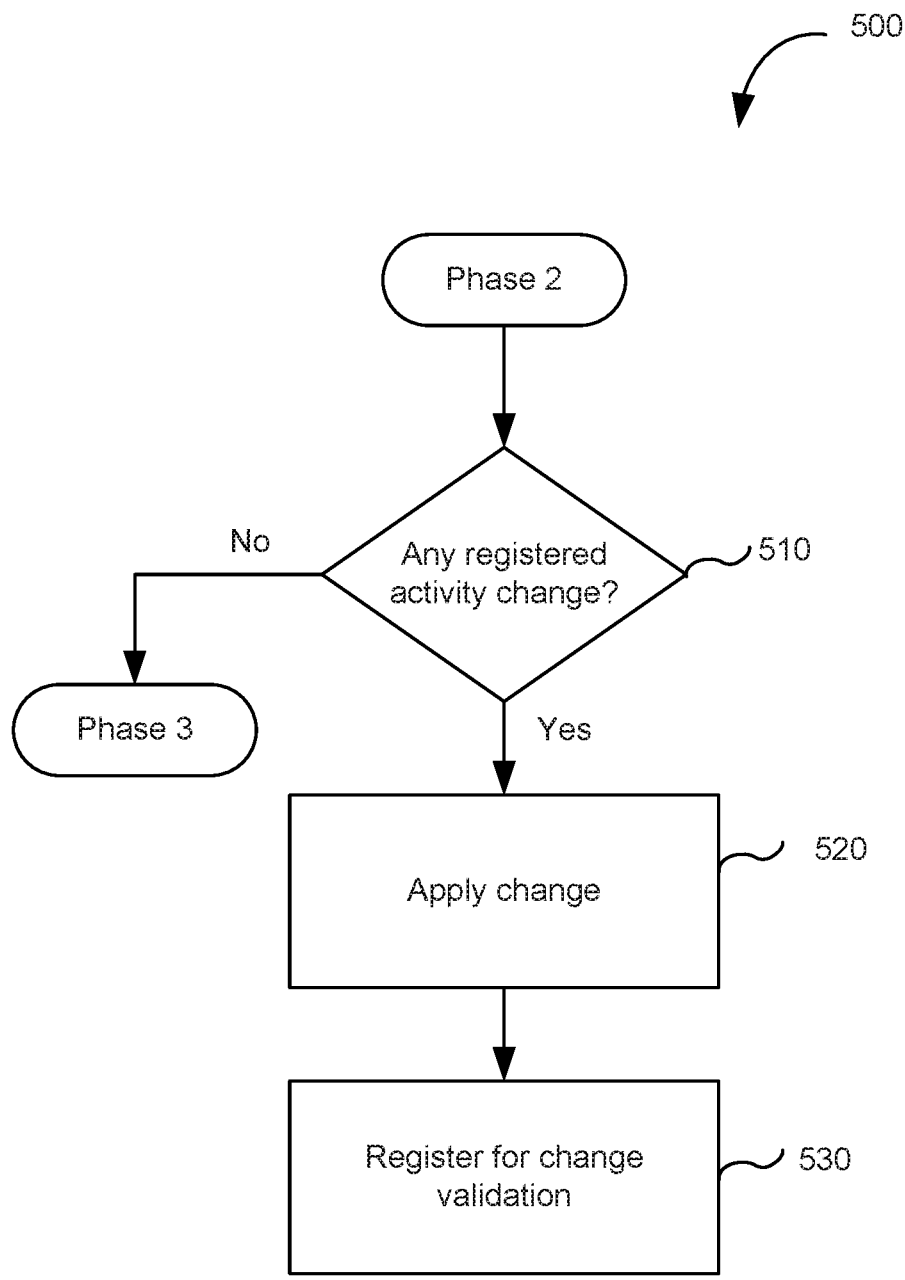
FIG. 5 illustrates a flowchart of a change application phase, in accordance with some example embodiments.

FIG. 5 is a flow diagram of a change application phase 500, in accordance with some example embodiments.

At step 510, it is determined whether there are any registered changes to activities. The registered activities can be obtained in the changed activity register. If there are no activities that have registered changes, the method can proceed to phase 3, which is the validation phase.

If there are activities that have registered changes, a first change that is registered in the changed activity register is obtained at step 510. That is, the change applier 320 can obtain the changes from the changed activity register 350.

If there are activities that have registered changes, at step 520, a first change that is registered in the changed activity register is applied. For example, activity D can apply pending changes.

After the registered change is applied, at step 530, the applied change is then registered for validation. The applied change can be registered in a validation register. For example, activity D can register itself for validation in phase 3. The process can be repeated until all changes that are registered in the changed activity register have been processed phase 2. For example, the process can repeat for activity E.

Figure 6:
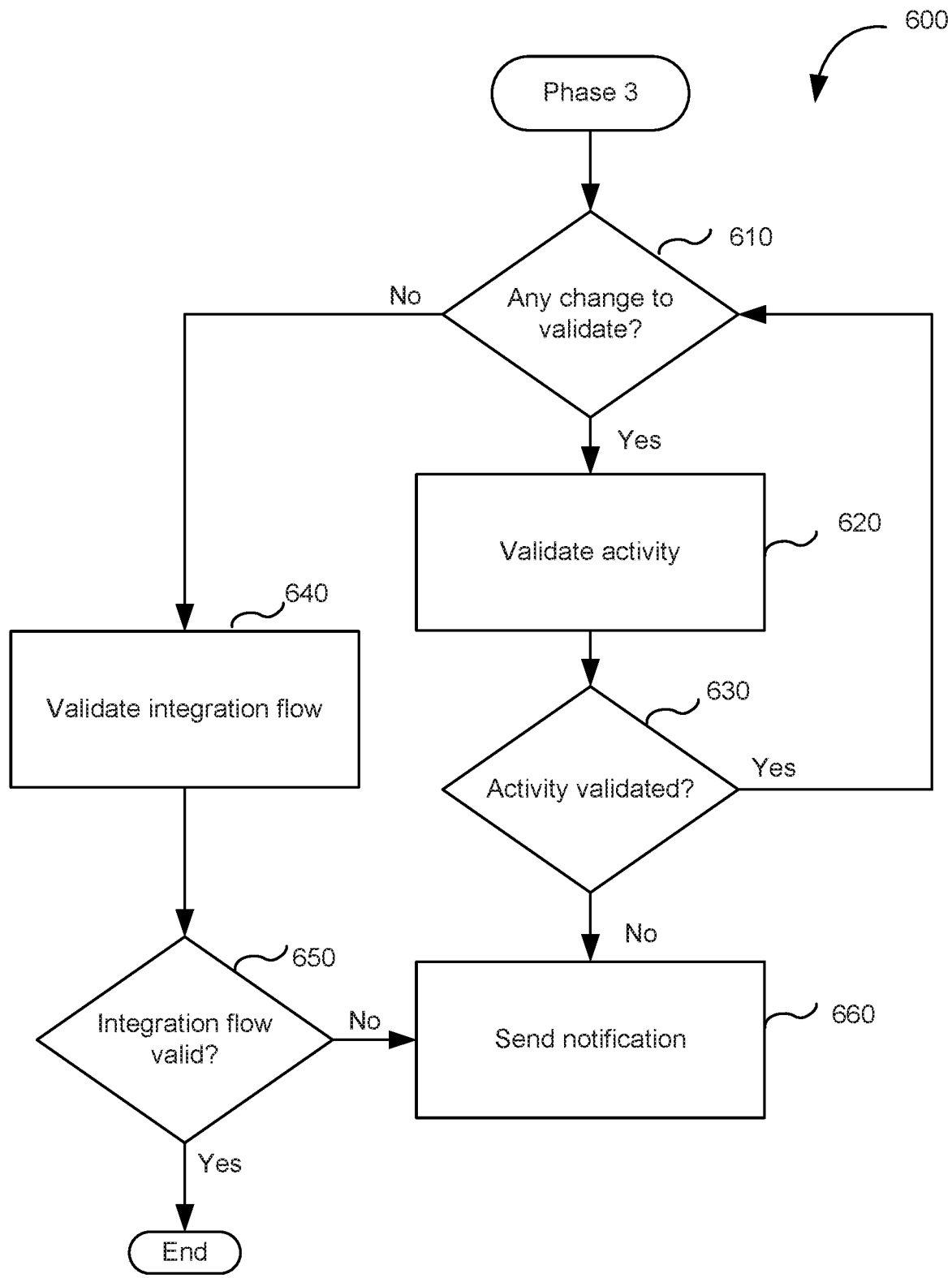
FIG. 6 illustrates a flowchart of a validation phase, in accordance with some example embodiments.

FIG. 6 is a flow diagram explaining a validation phase 600, in accordance with some example embodiments.

At step 610, it is determined whether there are any registered validations to be performed for changes to activities. The registered validations can be obtained from the change validation register 360.

If there are no activities registered for validation, then at step 640, the integration flow as a whole can be validated. That is, at this point, there are no changes to activities that require validation, therefore, the integration flow as a whole, which includes one or more activities can be validated.

If at step 650, the integration flow is valid, then the integration flow can be invoked by the user. That is, the integration flow can be used by the user to integrate application.

If, at step 610, there are changes registered for validation, at step 620, the activity is validated. For example, in the example discussed above activity D can be validated.

At step 630, it is determined whether the activity has been validated correctly. If the validation was performed correctly, the next activity that is stored in the change validation register is obtained. The process repeats until there are no further changes that require validation. For example, activity D can then be validated. The process can be repeated until all changes that are registered in the change validation register have been processed phase 3.

If at step 630, it is determined that the activity is not validated, at step 660 a notification can be sent notifying the user that the change is not valid. For example, the change may not be valid if the change results in an error or warning.

Although three phases are described, additional phases may be included or phases may be combined.

In accordance with some example embodiments, changes to the integration flow can be made in a systematic way that maintains consistency between the various activities of the integration flow and the integrity of the integration flow is maintained. Activities that are left in an invalid state after performing the three phase method, are identified and additional correction can be performed. Activities that fail validation are flagged accordingly (as a warning or error) for correction by the user.

Any errors or warnings identified during the validation phase can be communicated to the user for subsequent correction and/or used to limit or extend functionality. For example, if there are any errors the integration may be prevented from being deployed.

Designing an integration involves various activities joined together logically. This is a complex task. This is made more complicated when a user changes the dependencies of the activities. As more activities are orchestrated together, it becomes increasingly difficult to identify the impact of editing or deleting an activity which may make an integration incorrect, invalid or incomplete. An activity may be incomplete if it is, for example, missing information. For example, a variable may have been identified, but it has not been assigned a value. An activity that is identified as incomplete can also be identified as incorrect or invalid. An activity may be incorrect, if, for example, a variable has been assigned a value, however, the value is not compatible with the variable. For example, if a variable is a name and the value assigned to it is a number. An activity may be invalid. Therefore, an example embodiment provides a method for easily determining which nodes in an integration flow require correction.

II. Error and Warning Display

If activities in an integration flow are not operating correctly, the user can be provided with error and/or warning notifications. Therefore, the user can easily determine which activities in the integration flow have problems and whether or not the problem is an error or warning. Error and/or warning symbols can be displayed near activities in an integration flow so that the user can easily identify activities that have an error and/or warning. The error and/or warning symbol can be displayed adjacent to the affected activity so that a user can easily identify an affected activity. Further, error and/or warning notifications can also be provided on the user interface for the integration system. Here, for example, a notification palette.

Figure 7:
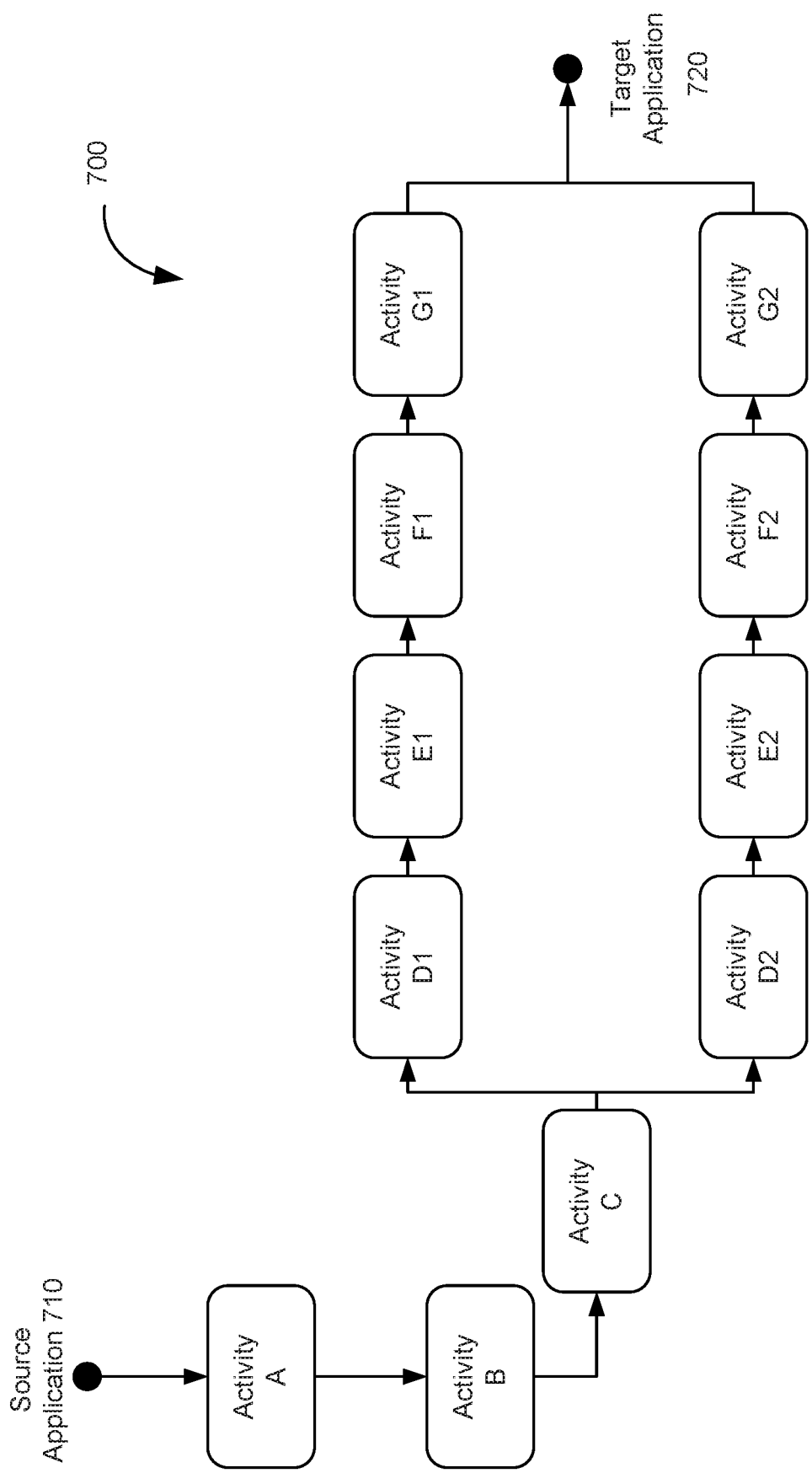
FIG. 7 illustrates a block diagram of an integration flow, in accordance with some example embodiments.

FIG. 7 illustrates a block diagram of an integration flow, in accordance with some example embodiments. The integration flow 700 shown in FIG. 7 includes more activities than that shown in FIG. 2. The integration flow 700 shown in FIG. 7 includes a source application 710 and a target application 720. Source application 710 and target application 720 are applications to be integrated. Source application 710 and target application 720 are application activities. There are no warnings or errors in the integration flow 700.

The integration flow 700 includes activity A, activity B, activity C, activity D1, activity D2, activity E1, activity E2, activity F1, activity F2, activity G1, and activity G2. The activities A through G2 are action activities that include that are to be performed on data from source application 710 so that the data can be used by target application 720.

The integration flow shown in FIG. 7 is a sequential integration flow. The integration flow 700 illustrates another example of an integration flow. An integration flow can include more application activities and action activities than that shown in FIG. 7. That is, a single source application may be integrated with a plurality of target applications. The source application, target application and actions can also be identified as nodes or elements of an integration flow.

In the example shown in FIG. 7, activity C can define an input that it accepts and it can define an output that is provides. Activities A and/or B may have dependencies to the input of activity C and activities D1 and activity D2 may have dependencies on the output of activity C.

If a user modifies activity C by changing an input of activity C, activity A and activity B may be effect since they may be dependent on the input of activity C. Any activity that is dependent on the input of activity C may be affected. If the user modifies the output of activity C then activity D1, activity D2, activity E1 and/or activity E2 may be affected. Specifically, any activity that is dependent on the output of activity C may be affected. It is also possible that a change to C's output impacts D1 which in-turn has an impact to E1. That is, a change to C has a direct impact on D1 and an indirect impact on E1. Even in this relatively simple sequential integration flow there are a number of possibilities in what may or may not be impacted by a given change.

In an example embodiment, potential issues are visually represented during the design phase of the integration flow. Changes to the integration flow that place an activity in an invalid state after the change is made, are identified. Activities that fail validation are flagged accordingly (as a warning or error or both) for correction.

Figure 8:
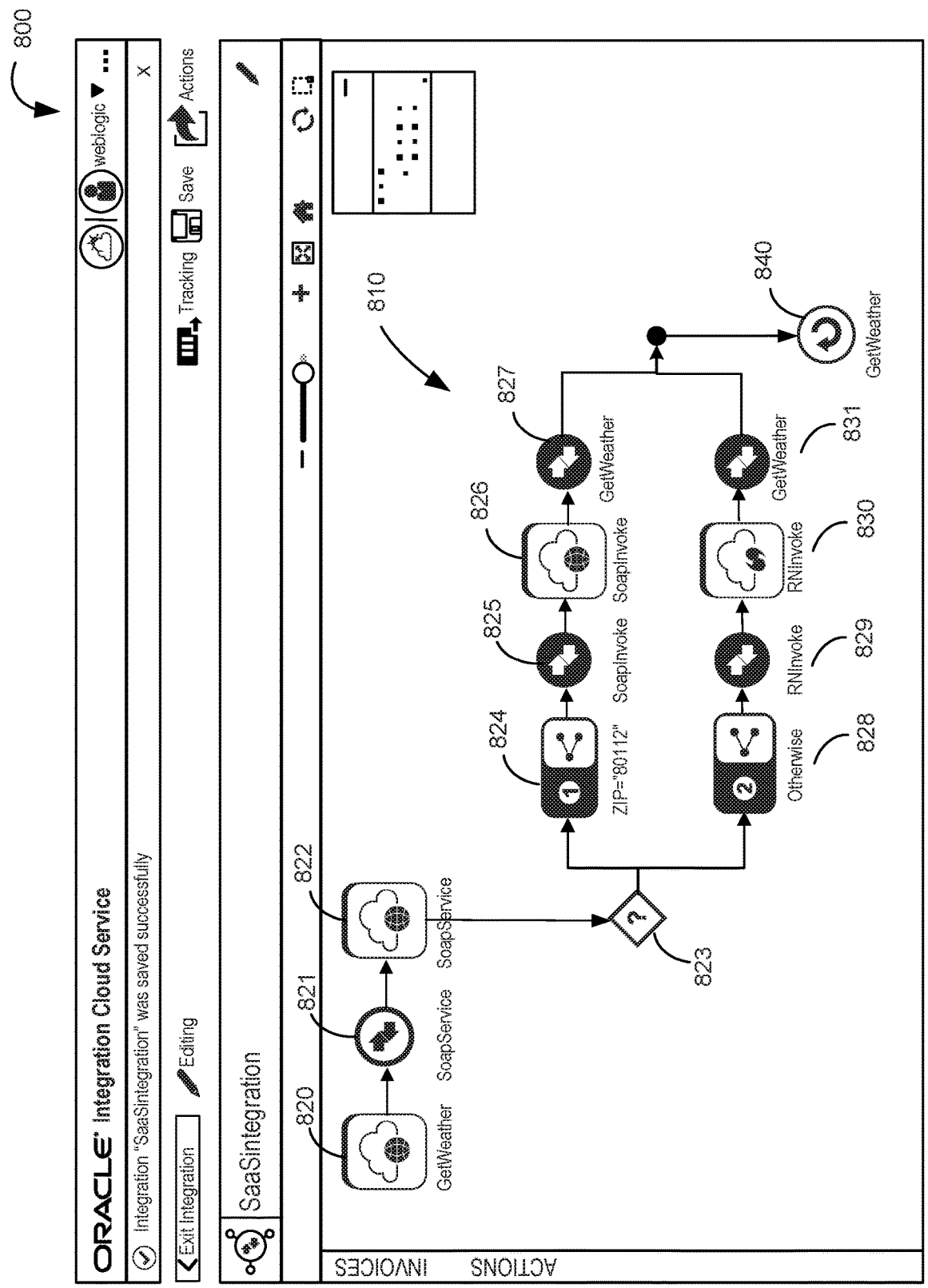
FIG. 8 illustrates a user interface displaying a valid integration flow, in accordance with some example embodiments.

FIG. 8 illustrates a user interface 800 displaying a valid integration flow, in accordance with some example embodiments. FIG. 8 also illustrates a user interface used by a user of the integration cloud service system. FIG. 8 illustrates an integration flow after the validation phase (third phase) has been performed. The integration flow 810 includes nodes 820-831.

In the integration flow 810 shown in FIG. 8, multiple activities receive an input from another activity and multiple activities provide their output as an input to another activity. In the example shown in FIG. 8 the integration flow is valid, therefore, no warnings or errors appear on the user interface. Therefore, the integration is in valid state.

The integration flow 810 includes source application 820, target application 840, and activities 820-831. The activities 820-831 are, for example, actions that can be applied to data in the source application 820 so that the data from source application 820 can be compatible with target application 840. The source application 820, target application 840, and activities 820-831 are nodes or elements that make up the integration flow 810. The nodes are connected by arrows which indicate the direction which the data travels. In the example shown in FIG. 8, data is returned to the source application.

Figure 9:
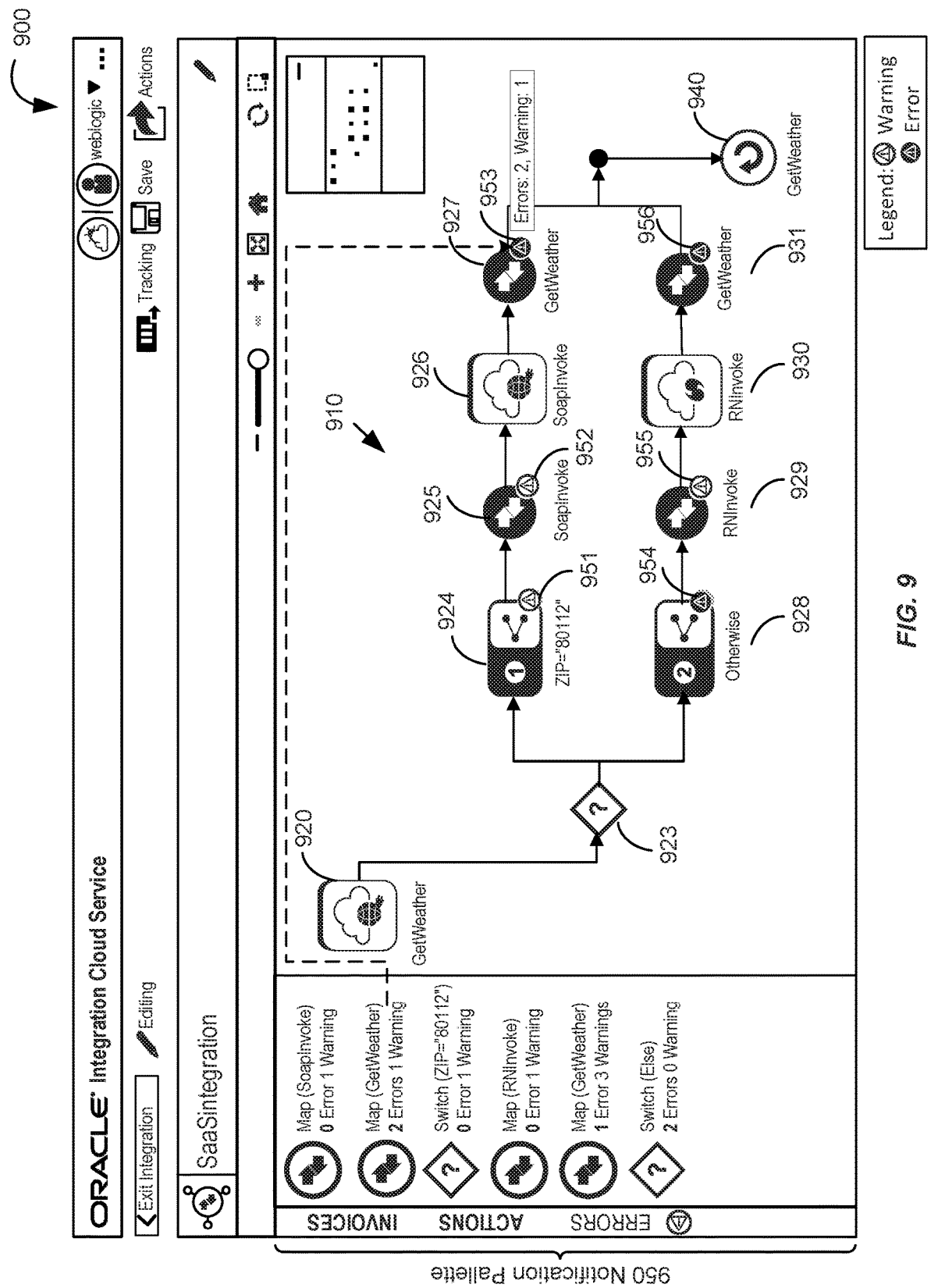
FIG. 9 illustrates a user interface displaying an invalid integration flow, in accordance with some example embodiments.

FIG. 9 illustrates a user interface 900 displaying an invalid integration flow, in accordance with some example embodiments. The integration flow 910 is similar to the integration flow 810 shown in FIG. 8, however, nodes 821 and 822 have been deleted of FIG. 8. FIG. 9 illustrates the integration flow 910 after the validation phase has been performed. The source application 920, target application 940, and activities 923-931 are nodes or elements that make up the integration flow 910. The nodes are connected by arrows which indicate the direction which the data travels. In the example shown in FIG. 9, data is returned to the source application.

Since activity 821 and activity 822 are no longer available, activities that are dependent on the output of activity 821 and 822 are identified with visual errors or warning overlay icons. As shown in FIG. 9, some of the nodes have errors or warnings. Nodes 924, 925, and 9292 have warning symbols 951, 952 and 955, respectively. Nodes 927, 954, and 931 have error symbols 953, 954 and 956, respectively.

The notification pallet 950 on the left lists all of the detected errors and/or warnings. The notification pallet 950 can also be called an error panel, error pane, a warning panel or notification panel. The notification pallet 950 can show all of the activities that are affected and the number of errors and warning for that activity. The notification pallet 950 can be positioned to the left, as shown in FIG. 9, or positioned to the right or the left of the user interface, as desired by the user. The notification pallet 950 shows the activity type as well as the number of error and warnings for each activity.

Activities that are affected include visuals warnings or errors. For example, nodes 924, 925 and 929 have a warning symbol and nodes 927, 928 and 931 have an error symbol. Each activity that is affected can include an overlay icon with warning or error. Node 922 includes warning icon 941, node 923 includes warning icon 942, node 945 includes warning icon 945. Node 925 includes error icon 943, node 926 includes warning icon 944 and node 929 includes warning icon 946.

A warning means that the integration flow can proceed, however, this may result in problems. An error means that the integration flow cannot proceed, and that correction is required. Errors can occur if, for example, a user changes an attribute (e.g., change an attribute from first_name to last_name) in source node 920, but does not update the attribute (e.g., from first_name to last_name) in the dependent nodes. As another example, errors and/or warnings can occur if a user deletes a node, but other nodes are dependent on the deleted node. These are merely examples, and other changes to the integration flow can result in errors and/or warnings.

Therefore, after performing the validation phase, the user is notified visually on the integration flow that there are nodes in the integration flow that require updating and/or correction. Further, the nodes that require the correction include the error or warning sign. Therefore, the user can easily determine which nodes need to be fixed.

The ability to represent impact of a change visually during design phase empowers a user to identify and resolve the issue while in the design stage phase of an integration flow. Thus it avoids the need to deploy the integration in a runtime environment and avoids the need to test and/or verify the integration during deployment.

After all the changes have been made, it can be determined whether the change to the activity will result in a major impact or a minor impact.

The design and development of the integration flow can be complicated since it may require various activities to be defined and the integration flow should be logically structured in order to achieve a desired outcome. The effort is further complicated in that changes made to a previously defined activity within the integration flow may negatively affect other activities. The negatively affected activities may become incorrect, invalid or incomplete.

Therefore, in accordance with some example embodiments, a method is provided for determining a level of impact of a change to an application activity in an existing integration flow and varying the underlying alterations made to the relevant and dependent activities. Propagation of changes may result in specific activities being automatically deleted by the system and/or updated by the system and/or in being set to an invalid state in which case the user may intervene to resolve any issues with the integration. By analyzing the level of impact of the changes and varying the underlying alterations, the repercussions to the integration flow as a whole can be minimized.

An integration flow can include a number of activities including the source application, target application and action activities. Based on the changes that are made to the application activities (e.g, source application and/or target application) in the integration flow, dependent activities may not be affected, may be minimally affected, or may be significantly affected.

III. Determining Level of Impact

In accordance with some example embodiments, the exact nature of the change that is made to an application activity is classified as a minor change or a major change. That is, a minor change will minimally affect action activities and a major change will significantly affect action activities. The classification can be used to vary the underlying alterations made to the affected action activities within the integration flow.

Figure 10:
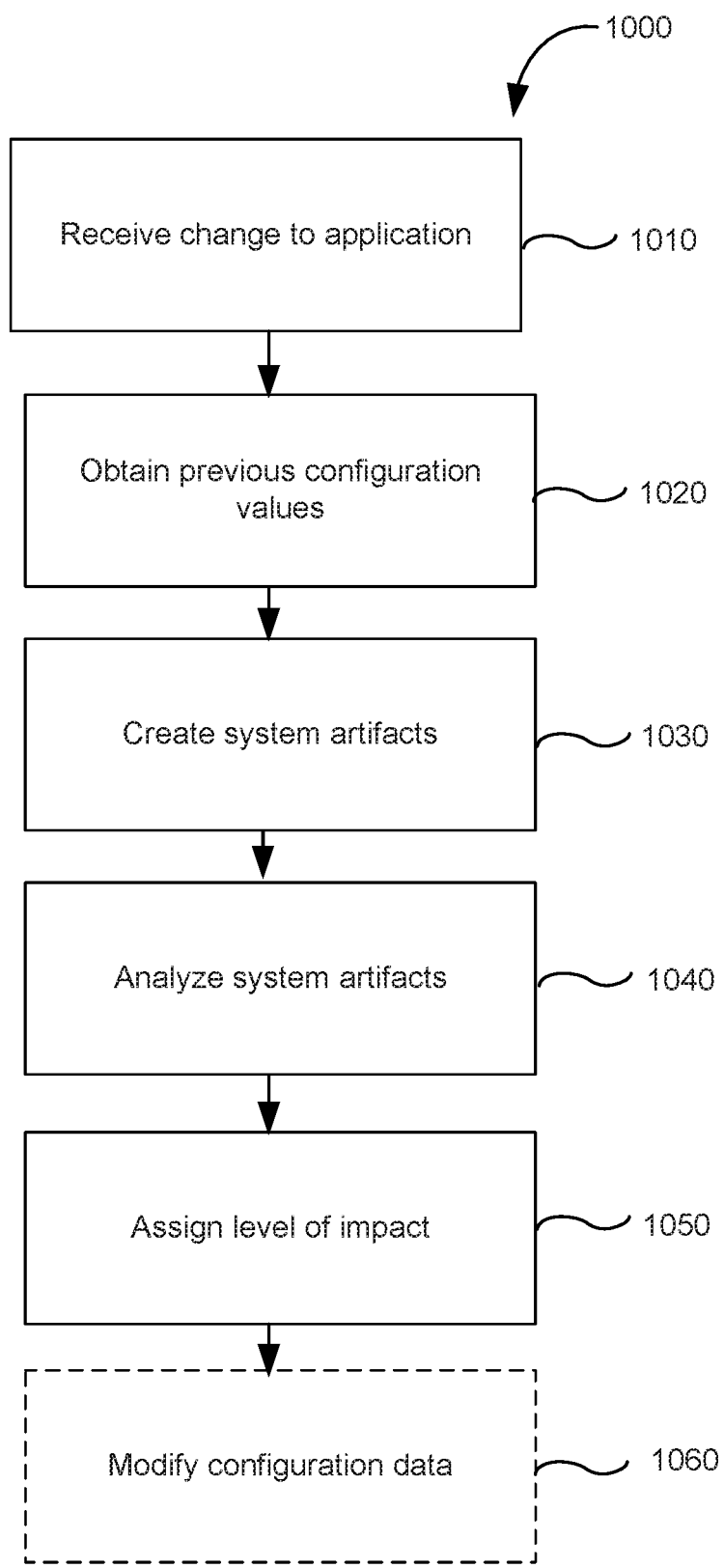
FIG. 10 illustrates a flowchart of a method for determining whether a change is a major change or a minor change, in accordance with some example embodiments.

FIG. 10 illustrates a flowchart of a method 1000 for determining whether a change to an application activity is a major change or a minor change, in accordance with some example embodiments. The method determines a level of impact of changes made to the source application and/or the target application. Determining the level of impact can be performed by the change classifier 1100 of the integration cloud service system 300.

Figure 11:
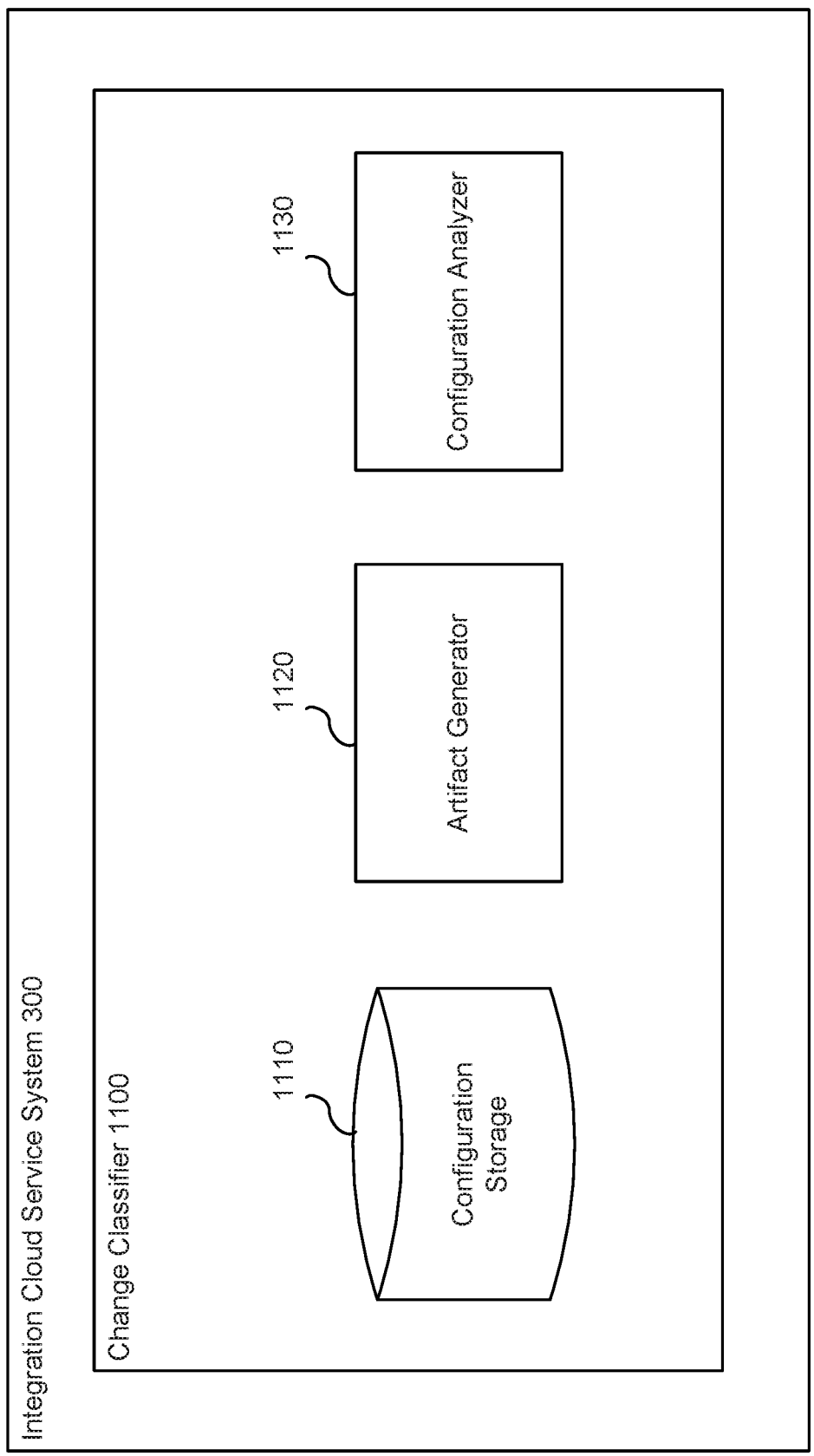
FIG. 11 illustrates a change classifier, in accordance with some example embodiments.

FIG. 11 illustrates the change classifier 1100, in accordance with some example embodiments. The change classifier 1100 can include configuration storage 1110, artifact generator 1120, and configuration analyzer 1130. The classification of the change as a major change or a minor change can be performed by the change classifier 1100 of the cloud integration service system.

As shown in FIG. 11, the change classifier can include a configuration storage 1110, an artifact generator 1120, and a configuration analyzer 1130. Configuration storage 1110 can store previous configuration values of the source application and/or target application. Configuration storage 1110 can also store configuration values for action activities. Therefore, if a user would like to obtain previous configuration values of a source application or a target application, the previous configuration values can be obtained from the configuration storage 1110. The artifact generator 1120 can generate artifacts. The configuration analyzer 1130 can analyze the information.

At step 1010, a change to a source application and/or a target application is received from a user. The change can be made via a user interface of the cloud application system. The source application can be identified as a trigger and the target application can be identified as an invoke.

After the user has completed the desired changes to the source application and/or target application, at step 1020, the relevant previous configuration values of the application that is modified can be retrieved. The previous configuration values can be retrieved via configuration storage 380.

At step 1030, system artifacts are created to represent the application activity. The system artifacts can be generated by artifact generator 1120.

At step 1040, the system artifacts that were created to represent the application activity are analyzed for any new relevant new configuration values. The system artifacts can be analyzed by configuration analyzer 1130. The previous values are compared to the new values.

At step 1050, after analyzing the changes, a level of impact can be assigned to the change. The level that is assigned can be classified as either a 'major change' or a 'minor change'.

The following changes are examples of major changes: the application message exchange pattern (MEP), the root element name, root element namespace of the request input, root element name, or root element namespace of the response output. These are merely examples and other kinds of changes may be identified as a major change depending on for example, the type of application.

A message exchange pattern can include, for example, asynchronous two-way communication or asynchronous one-way communication. Fire forget is an example of an asynchronous one-way communication. With a fire forget message exchange pattern, a source application may send a message to the integration system, such as a message that includes a request for a change, however, the source application will not expect the integration system to send a message in return. Therefore, in an asynchronous communication, the source application is not blocking. The source application can send a message to the integration system, however the source system is not waiting for a response. The source application will proceed with any next steps without waiting for a response. Eventually, integration system can send a response to the source application. The response from the integration system can occur immediately or it can occur at a later time (e.g., 5 minutes later, 1 hour later). In asynchronous communication, the source application is not waiting for an immediate response from the integration system.

Another example of a message exchange pattern can include, for example, synchronous communication. With synchronous communication, the source application can send a message to the integration system and the source application can expect a response from the integration system before proceeding. In synchronous communication, the source application is waiting for an immediate response from the integration system. Therefore, in a synchronous communication resource application is blocking.

Therefore, changes to the message exchange pattern are considered to be a major change.

When a user configures a source application, the user can configure the data structure for the source application. The data structure identifies the data that should be sent to the source application and the data that the source application will respond with. For example, the source application may expect a data structure A to be sent to it, and in response, it will send back a data structure B. These data structures can be, for example, WSDL data structures. WSDL is an XML-based interface definition language. A WSDL data structure will have one or more root elements and one or more root element name spaces. The request, which is the message that is sent from the source application, and the response which is a message that is sent back to the source application, have WSDL which are going to have these root element name and a root element namespace. If either the root element name or the root element namespace changes, the change will change the shape of the message. Therefore, this is considered a major change.

If the changes are not a major change, such as the examples described above, then the change will be considered a minor change. Examples of minor changes include, for example, changing a description in the application.

At step 1060, based on the classification of the changes as 'major' or 'minor', alterations can be made to the underlying configuration data of the affected activities which vary based on the classification. The configuration data of the affected activities can be stored in the configuration storage 1110 and the alternations can be made to the configuration data that is stored in the configuration storage 1180.

For example, if the change set is classified as "major", then the following alterations can be performed: remove and re-add the internals of the application, if a map is using any of the old message contexts as a primary input or output, delete the map, if a map is only using any of the old message contexts as a secondary input, remove that secondary input.

If the change set is classified as MINOR, then the following alterations can be performed: replace the contents of the REQUEST.wsdl, remove and re-add all other resources, remove and re-add any faults and their associated message contexts, update description and hasAttachment, if a map is using either the request input or response output message context as a primary input, output, or secondary input, validate the map, if a map is using any of the old fault message contexts as a primary input or output, delete the map, if a map is only using any of the old fault message contexts as a secondary input, remove that secondary input.

Figure 12:
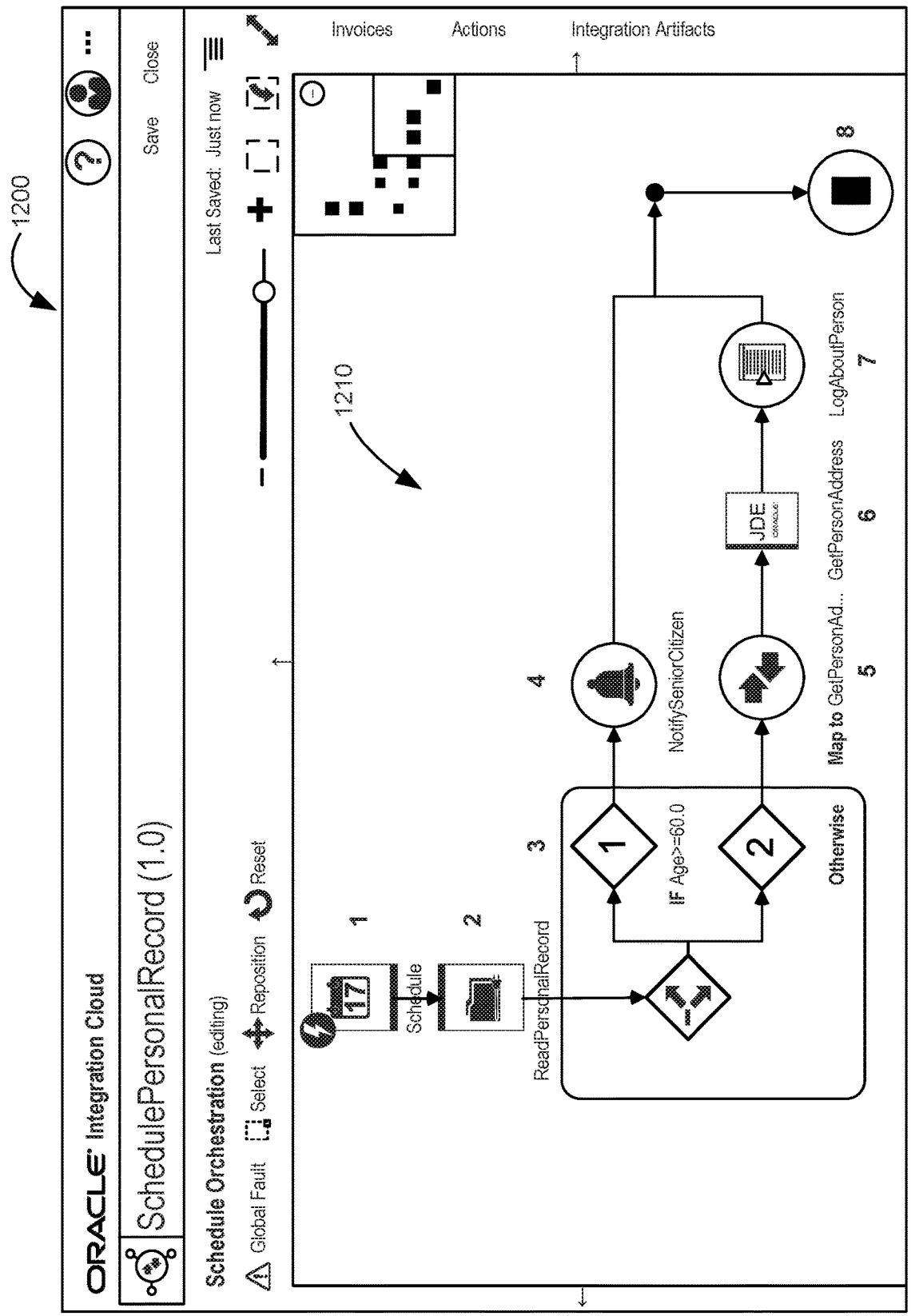
FIG. 12 illustrates an example operation of an integration flow, in accordance with some example embodiments.

FIG. 12 illustrates an example operation of an integration flow, in accordance with some example embodiments. The sequence described in FIG. 12 occurs after the validation phase (phase 3) is performed.

At step 1, the trigger or start of the integration flow tries to "read" from files (e.g., personal records). At step 2, the integration flow attempts to "read" from files using an file transfer protocol (FTP) connection. With an FTP connection, read, list, delete etc. operations can be performed on a file using FTP protocol. The files can include information about a client such as age. The files that are read can be, for example, a file that is used to store tabular data, such as a spreadsheet or database. For example, the read file can be a .csv file.

A record can include:
Name,Age,mail,phone
Joe,27,joe@oracle.com,900900110

At step 3, if the age of the person in the "read" file is more than 60 years old, then at step 4, a notification will be sent to the user. For example, an email can be sent to the user. That is, if the client meets the particular criteria, then they will be provided with a notification. Step 3 visually represents a "Switch" activity. Different routes of execution will happen depending on the "Age" value at runtime. If at step 3, the age of the person in the "read" file is less than 60 years old, at step 5 mapping is performed, so that address information can be obtained from another application (e.g., software as a service (SaaS application)). A user can define the mapping i.e. transforms one form of message or payload to another form. At runtime it can form the request payload to the SaaS application i.e. "JDE". Then at step 6, the cloud integration service system will fetch address information from another SaaS application. JD Edwards EnterpriseOne cloud application connection. At step 7, the obtained client information is logged into the system. At step 8, execution stops.

Figure 13:
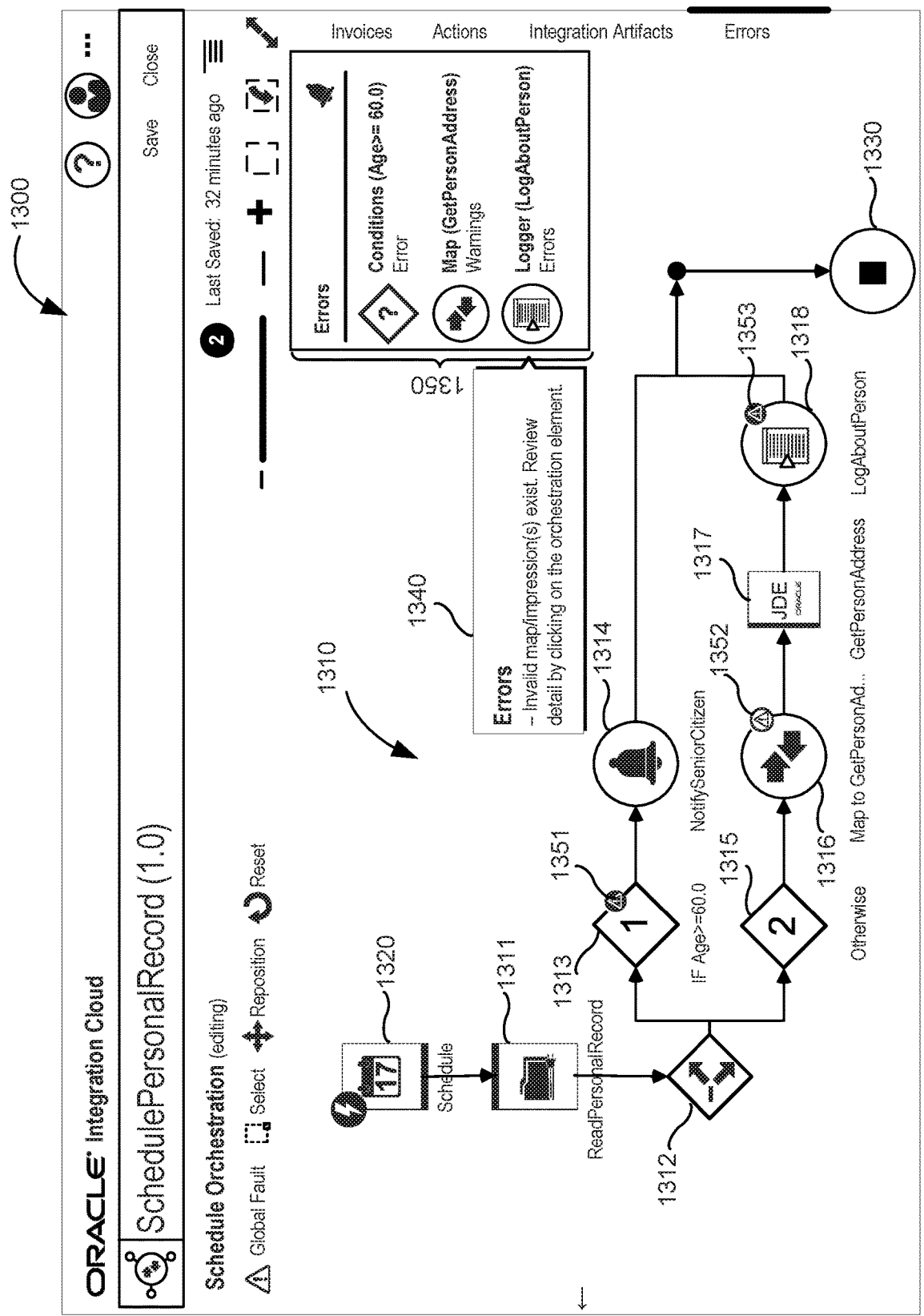
FIG. 13 illustrates a user interface in which a user makes a minor change, in accordance with some example embodiments.

FIG. 13 illustrates a user interface 1300 in which a user makes a minor change, in accordance with some example embodiments. Integration flow 1310 includes nodes 1320-1330. Node 1313 has an error symbol 1351, node 1318 has an error symbol 1353, and node 1316 has a warning symbol.

A minor change can include the user changing the personal information record. For example if the user changes "Age" to "Date of Birth (DOB)". For example, if the record now includes:
Name,DOB,mail,phone
Joe,1-Jun-1987,joe@oracle.com,900900110

Figure 14:
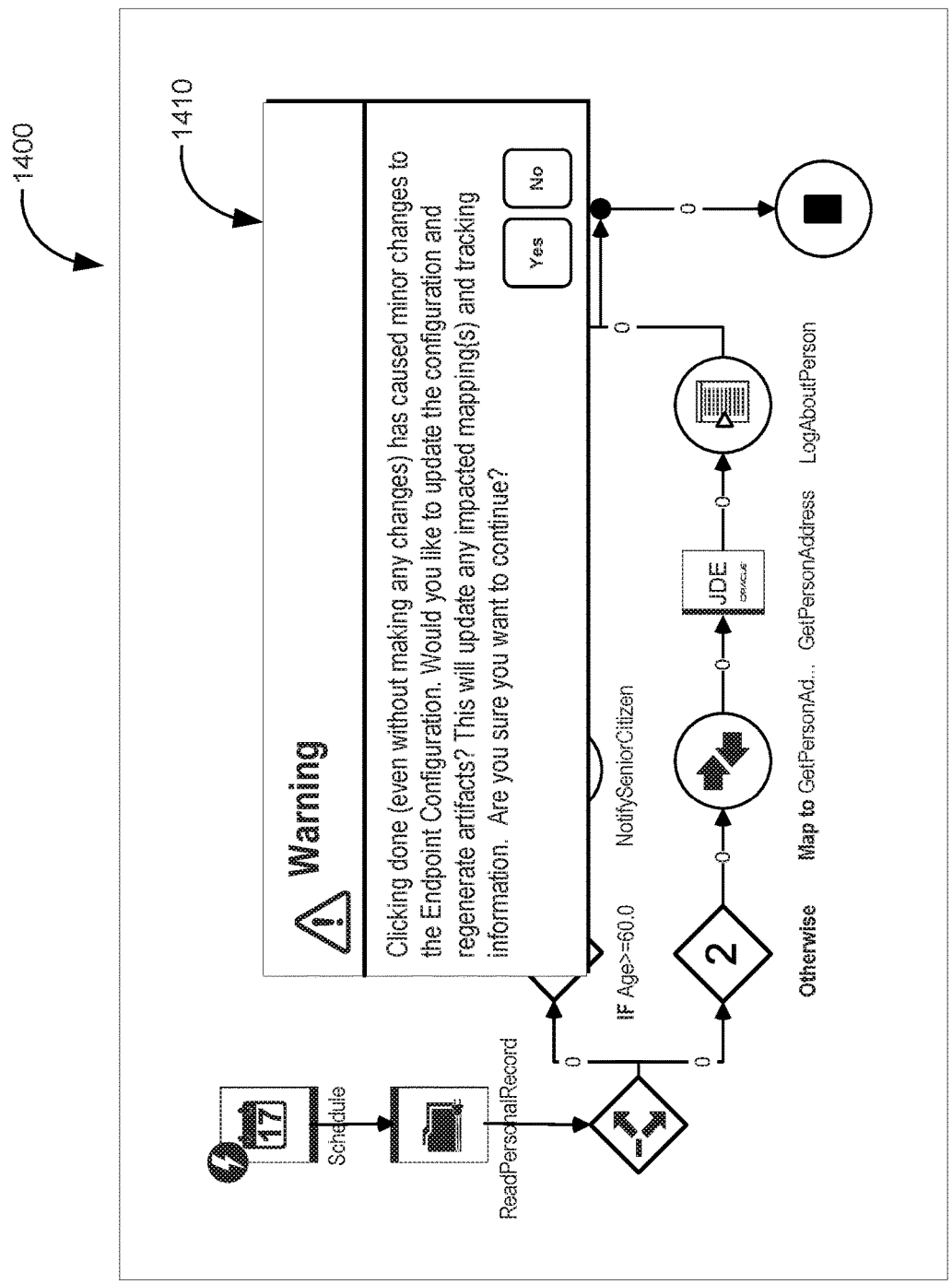
FIG. 14 illustrates a user interface displaying a minor change warning, in accordance with some example embodiments.

FIG. 14 illustrates a user interface displaying a minor change warning, in accordance with some example embodiments.

As shown in FIG. 14, the user interface 1400 displays a notification 1410 that notifies the user that they have made a minor change. The notification 1410 can be a warning or notification that is brought to the attention of the user. The notification 1410 can appear in a pop-up window. The notification 1410 can prompt to user to confirm that they would like to proceed with the minor change. The user is provided with the notification 1410 and prompt for input to ensure that the user would like to proceed with their changes.

Figure 15:
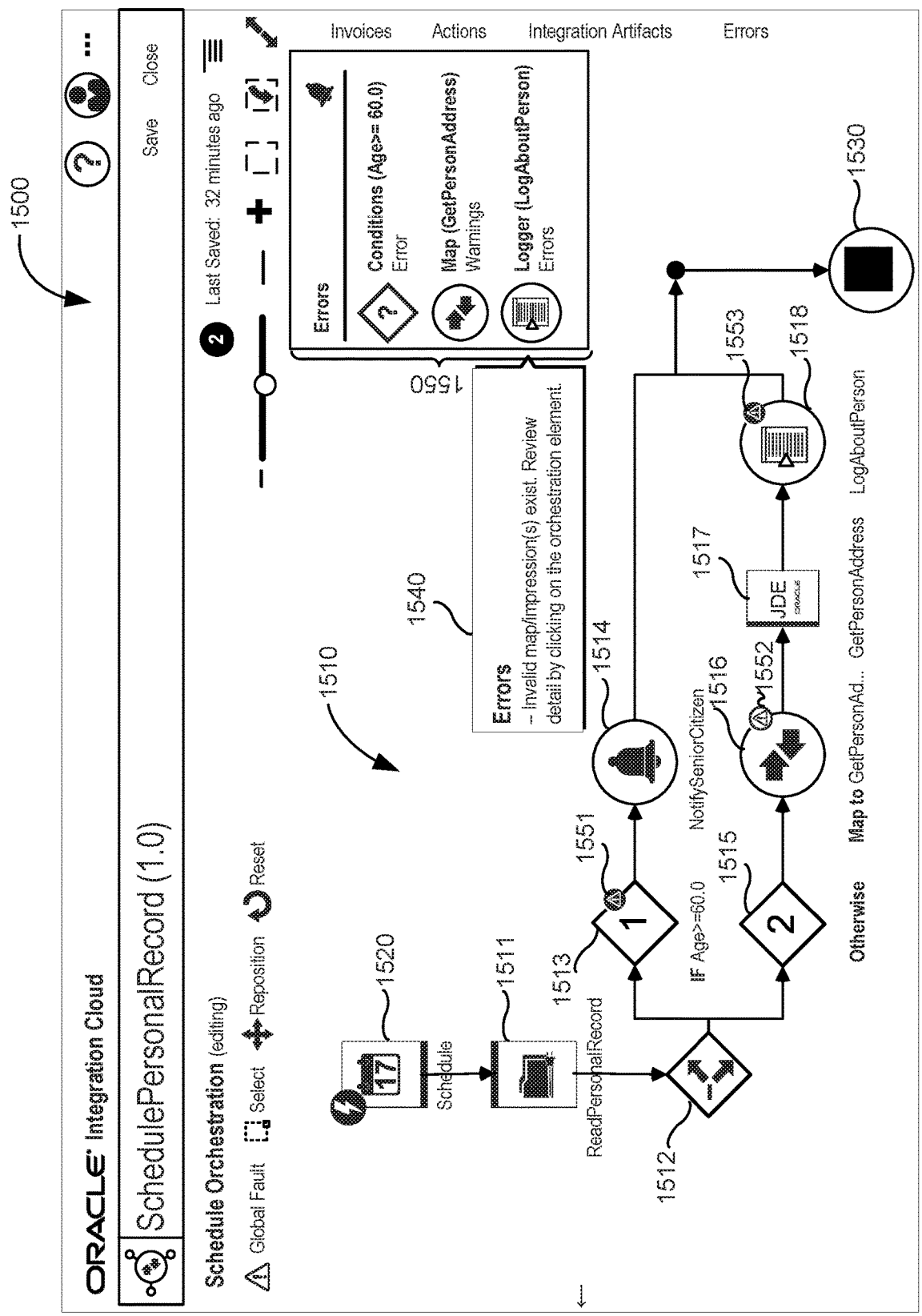
FIG. 15 illustrates a user interface in which a user makes a major change, in accordance with some example embodiments.

FIG. 15 illustrates a user interface 1500 in which a user makes a major change, in accordance with some example embodiments. Integration flow 1510 includes nodes 1520-1530. Node 1513 includes error symbol 1551, node 1518 includes error symbol 1553, and node 1516 includes a warning symbol 1552.

A major change can include changing the operation. For example, a user may have changed an FTP operation. For example, the FTP operation may have been changed from a "Read" operation to a "Delete" operation. Therefore, instead of reading the personal record, if the user changes the activity to delete the personal record.

Figure 16:
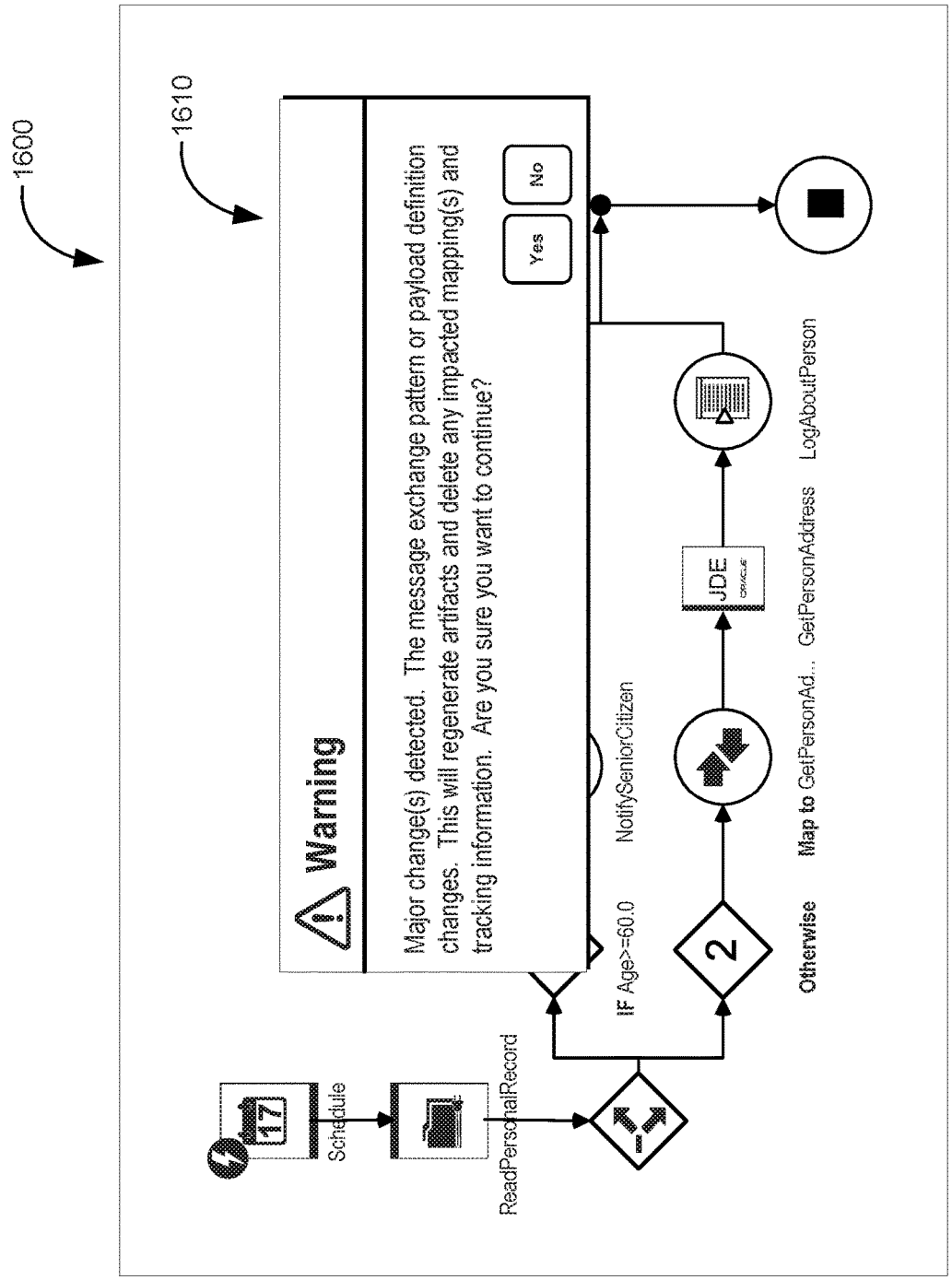
FIG. 16 illustrates a user interface displaying a major change warning, in accordance with some example embodiments.

FIG. 16 illustrates a user interface displaying a major change warning, in accordance with some example embodiments.

As shown in FIG. 16, the user interface 1600 displays a notification 1610 that notifies the user that they have made a major change. The notification 1610 can be a warning or notification that is brought to the attention of the user. The notification 1610 can appear in a pop-up window. The notification 1610 can prompt to user to confirm that they would like to proceed with the major change. The user is provided with the notification 1410 and prompt for input to ensure that the user would like to proceed with their changes.

In the example shown in FIG. 14 and FIG. 16, the notification specifically informs the user whether their change is a major or a minor change. Therefore, the user can more easily determine whether or not they want to proceed with the change.

IV. Computer System

Figure 17:
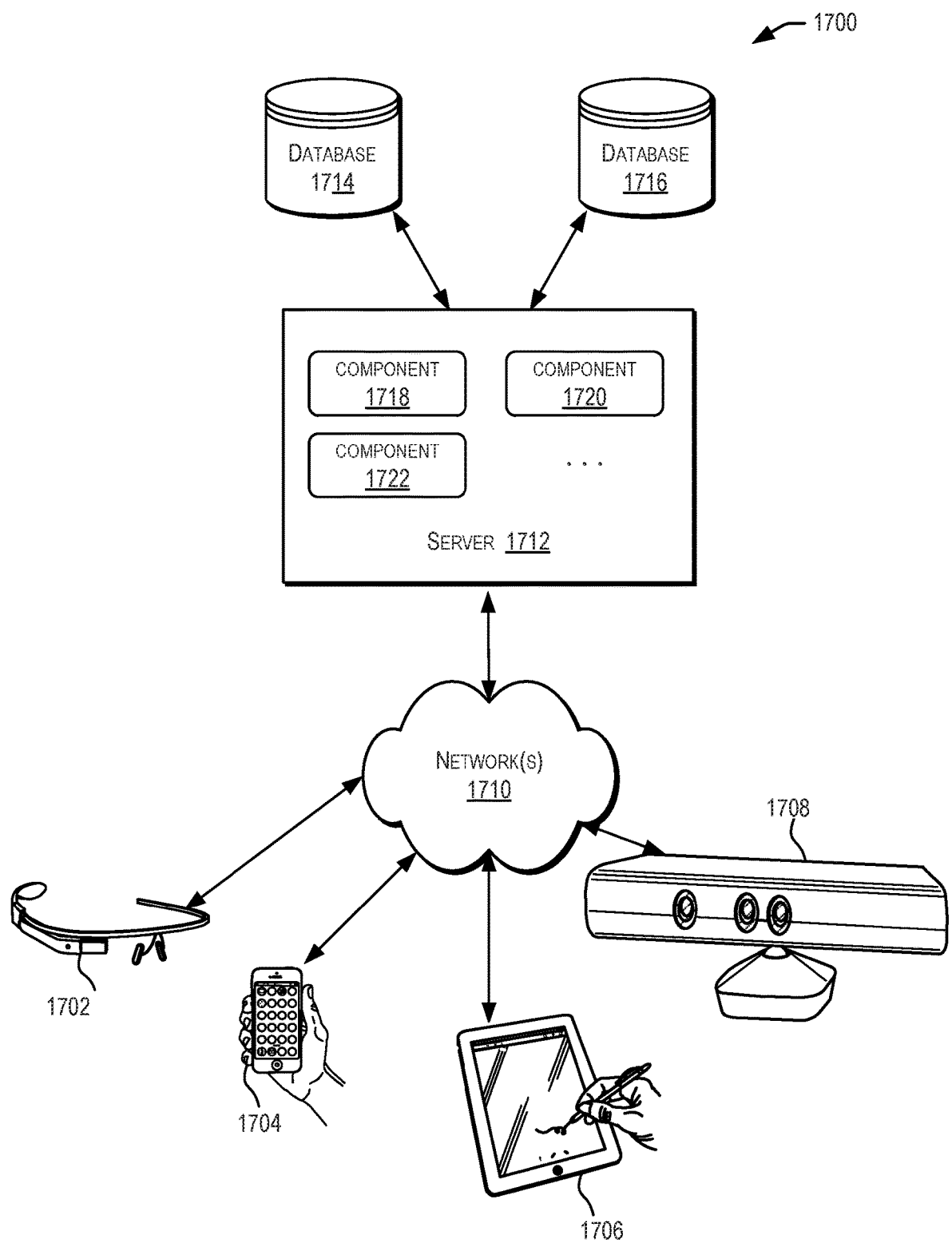
FIG. 17 illustrates a simplified diagram of a distributed system for implementing some example embodiments.
Figure 18:
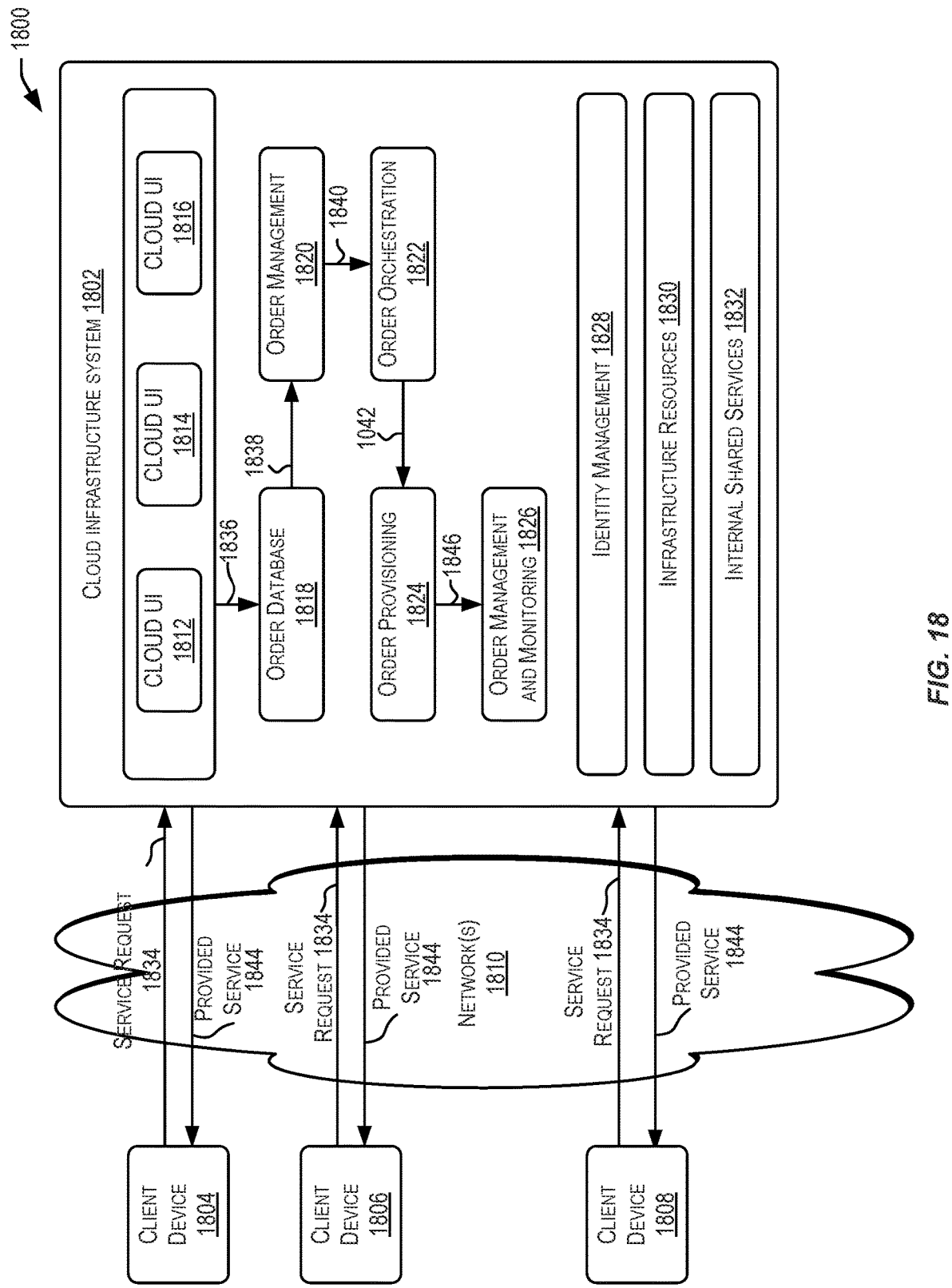
FIG. 18 illustrates a simplified block diagram of one or more components of a system environment in which services may be offered as cloud services, in accordance with some example embodiments.
Figure 19:
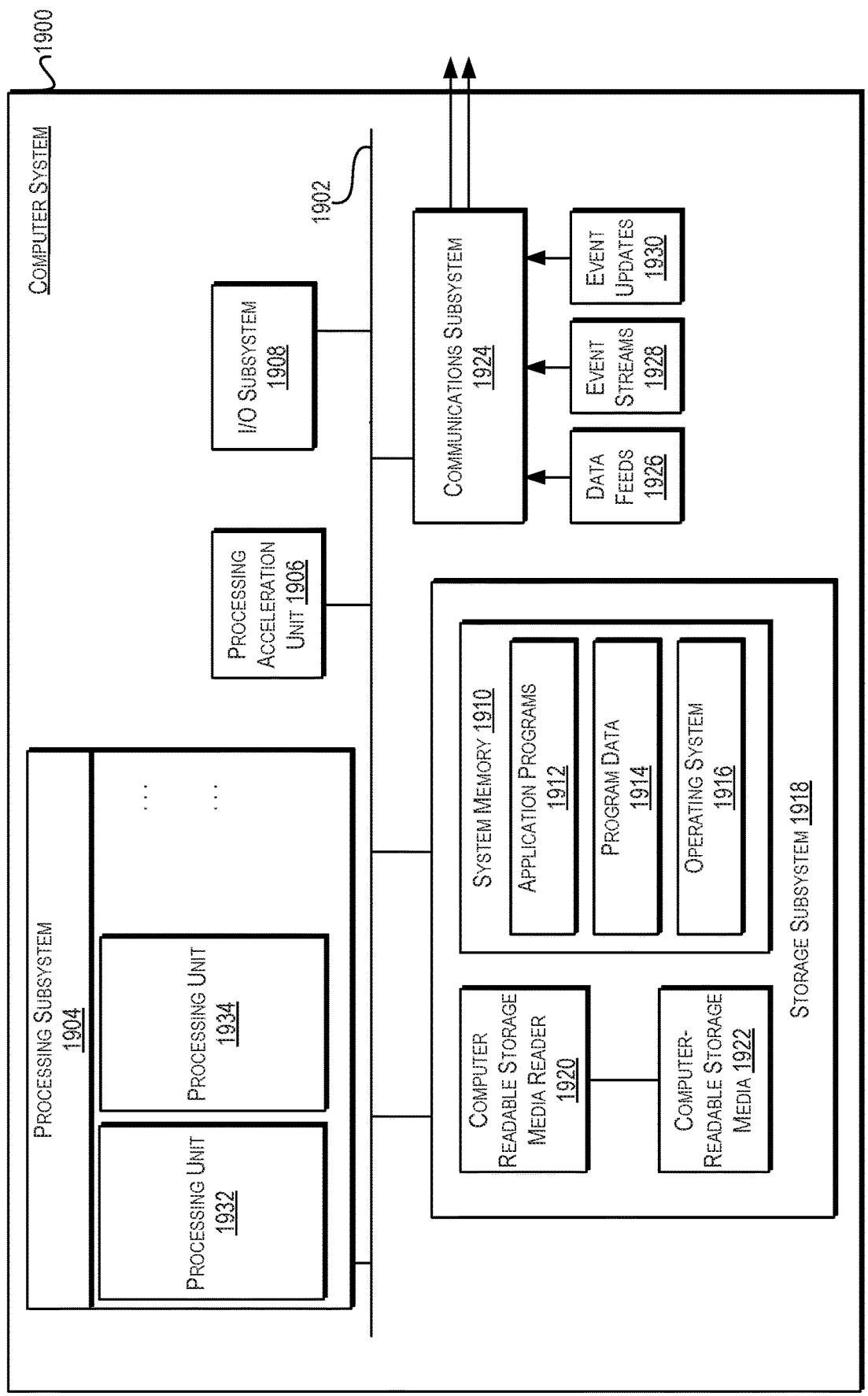
FIG. 19 illustrates an exemplary computer system that may be used to implement certain components according to some example embodiments.

FIGS. 17, 18, and 19 illustrate exemplary hardware and/or software configurations used in various embodiments.

FIG. 17 illustrates a simplified diagram of a distributed system for implementing some example embodiments. In the illustrated embodiment, distributed system 1700 includes one or more client computing devices 1702, 1704, 1706, and 1708, which are configured to execute and operate a client application such as a web browser, proprietary client (e.g., Oracle Forms), or the like over one or more network(s) 1710. Server 1712 may be communicatively coupled with remote client computing devices 1702, 1704, 1706, and 1708 via network 1710.

In various embodiments, server 1712 may be adapted to run one or more services or software applications such as services and applications that provide code and/or data for performing efficient application configuration patching for applications executing at the server 1712 or another server. In certain embodiments, server 1712 may also provide other services or software applications that can include non-virtual and virtual environments. In some embodiments, these services may be offered as web-based or cloud services or under a Software as a Service (SaaS) model to the users of client computing devices 1702, 1704, 1706, and/or 1708. Users operating client computing devices 1702, 1704, 1706, and/or 1708 may in turn utilize one or more client applications to interact with server 1712 to utilize the services provided by these components.

In the configuration depicted in FIG. 17, software components 1718, 1720 and 1722 of system 1700 are shown as being implemented on server 1712. As one example, one or more of the components (e.g., software component 1718) may be the configuration patch module or binary patch module discussed throughout the application.

In other embodiments, one or more of the components of system 1700 and/or the services provided by these components may also be implemented by one or more of the client computing devices 1702, 1704, 1706, and/or 1708. Users operating the client computing devices may then utilize one or more client applications to use the services provided by these components. These components may be implemented in hardware, firmware, software, or combinations thereof. It should be appreciated that various different system configurations are possible, which may be different from distributed system 1700. The embodiment shown in FIG. 17 is thus one example of a distributed system for implementing an embodiment system and is not intended to be limiting.

Client computing devices 1702, 1704, 1706, and/or 1708 may include various types of computing systems. For example, client computing devices may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 1710.

Although distributed system 1700 in FIG. 17 is shown with four client computing devices, any number of client computing devices may be supported. Other devices, such as devices with sensors, etc., may interact with server 1712.

Communication network(s) 1710 in distributed system 1700 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 170 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red (IR) network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 1712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1712 can include one or more virtual machines running virtual operating systems, or other computing architectures involving virtualization. One or more flexible pools of logical storage devices can be virtualized to maintain virtual storage devices for the server. Virtual networks can be controlled by server 1712 using software defined networking. In various embodiments, server 1712 may be adapted to run one or more services or software applications described in the foregoing disclosure.

Server 1712 may run an operating system including any of those discussed above, as well as any commercially available server operating system. Server 1712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

Distributed system 1700 may also include one or more databases 1714 and 1716. These databases may provide a mechanism for storing information such as user interactions information, usage patterns information, adaptation rules information, and other information used by example embodiments. Databases 1714 and 1716 may reside in a variety of locations. By way of example, one or more of databases 1714 and 1716 may reside on a non-transitory storage medium local to (and/or resident in) server 1712. Alternatively, databases 1714 and 1716 may be remote from server 1712 and in communication with server 1712 via a network-based or dedicated connection. In one set of embodiments, databases 1714 and 1716 may reside in a storage-area network (SAN). Similarly, any necessary files for performing the functions attributed to server 1712 may be stored locally on server 1712 and/or remotely, as appropriate. In one set of embodiments, databases 1714 and 1716 may include relational databases, such as databases provided by Oracle, that are adapted to store, update, and retrieve data in response to SQL-formatted commands. However, databases 1714 and 1716 may provide relational databases, object-oriented databases, object-relational databases, NoSQL databases, etc., and may or may not be SQL-based. For example, databases 1714 and/or 1716 may be Oracle Database, PostgreSQL, Microsoft SQL Server, MySQL, MemSQL, Memcached, Redis, MongoDB, BigTable, Cassandra, DB2, Solr, etc.

In some embodiments, code and/or data for performing efficient application configuration patching may be offered as services via a cloud environment. FIG. 18 is a simplified block diagram of one or more components of a system environment 1800 in which services may be offered as cloud services, in accordance with some embodiments of the present disclosure. In the illustrated embodiment in FIG. 18, system environment 1800 includes one or more client computing devices 1804, 1806, and 1808 that may be used by users to interact with a cloud infrastructure system 1802 that provides cloud services. Additionally, in some embodiments the "client" computing devices 1804, 1806, 1808 may actually be server computers acting as a client in a client-server relationship, where the server may provide application configuration patching services. Cloud infrastructure system 1802 may comprise one or more computers and/or servers that may include those described above for server 1712.

It should be appreciated that cloud infrastructure system 1802 depicted in FIG. 18 may have other components than those depicted. Further, the embodiment shown in FIG. 18 is one example of a cloud infrastructure system that may incorporate an example embodiment. In some other embodiments, cloud infrastructure system 1802 may have more or fewer components than shown in the figure, may combine two or more components, or may have a different configuration or arrangement of components.

Client computing devices 1804, 1806, and 1808 may be devices similar to those described above for 1702, 1704, 1706, and 1708. Client computing devices 1804, 1806, and 1808 may be configured to operate a client application such as a web browser, a proprietary client application (e.g., Oracle Forms), or some other application, which may be used by a user of the client computing device to interact with cloud infrastructure system 1802 to use services provided by cloud infrastructure system 1802. Although exemplary system environment 1800 is shown with three client computing devices, any number of client computing devices may be supported. Other devices such as devices with sensors, etc. may interact with cloud infrastructure system 1802.

Communication network(s) 1710 may facilitate communications and exchange of data between clients 1804, 1806, and 1808 and cloud infrastructure system 1802. Each network may be any type of network familiar to those skilled in the art that can support data communications using any of a variety of commercially-available protocols, including those described above for communication network(s) 1710.

In certain embodiments, services provided by cloud infrastructure system 1802 may include a host of services that are made available to users of the cloud infrastructure system on demand. In addition to services related to providing code and/or data for performing efficient application configuration patching operations, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 1802 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1802 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 1802 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 1802 may be adapted to automatically provision, manage and track a customer's subscription to services offered by cloud infrastructure system 1802. Cloud infrastructure system 1802 may provide the cloud services via different deployment models. For example, services may be provided under a public cloud model in which cloud infrastructure system 1802 is owned by an organization selling cloud services (e.g., owned by Oracle Corporation) and the services are made available to the general public or different industry enterprises. As another example, services may be provided under a private cloud model in which cloud infrastructure system 1802 is operated solely for a single organization and may provide services for one or more entities within the organization. The cloud services may also be provided under a community cloud model in which cloud infrastructure system 1802 and the services provided by cloud infrastructure system 1802 are shared by several organizations in a related community. The cloud services may also be provided under a hybrid cloud model, which is a combination of two or more different models.

In some embodiments, the services provided by cloud infrastructure system 1802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1802. Cloud infrastructure system 1802 then performs processing to provide the services in the customer's subscription order.

In some embodiments, the services provided by cloud infrastructure system 1802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 1802 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 1802 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database-as-a-Service (DaaS) in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1802 may also include infrastructure resources 1830 for providing the resources used to provide various services to customers of the cloud infrastructure system. In one embodiment, infrastructure resources 1830 may include pre-integrated and optimized combinations of hardware, such as servers, storage, and networking resources to execute the services provided by the PaaS platform and the SaaS platform, and other resources.

In some embodiments, resources in cloud infrastructure system 1802 may be shared by multiple users and dynamically re-allocated per demand. Additionally, resources may be allocated to users in different time zones. For example, cloud infrastructure system 1802 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1832 may be provided that are shared by different components or modules of cloud infrastructure system 1802 to enable provisioning of services by cloud infrastructure system 1802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1802 may provide comprehensive management of cloud services (e.g., SaaS, PaaS, and IaaS services) in the cloud infrastructure system. In one embodiment, cloud management functionality may include capabilities for provisioning, managing, and tracking a customer's subscription received by cloud infrastructure system 1802, and the like.

In one embodiment, as depicted in FIG. 18, cloud management functionality may be provided by one or more modules, such as an order management module 1820, an order orchestration module 1822, an order provisioning module 1824, an order management and monitoring module 1826, and an identity management module 1828. These modules may include or be provided using one or more computers and/or servers, which may be general purpose computers, specialized server computers, server farms, server clusters, or any other appropriate arrangement and/or combination.

In an exemplary operation, at 1834, a customer using a client device, such as client device 1804, 1806 or 1808, may interact with cloud infrastructure system 1802 by requesting one or more services provided by cloud infrastructure system 1802 and placing an order for a subscription for one or more services offered by cloud infrastructure system 1802. In certain embodiments, the customer may access a cloud User Interface (UI) such as cloud UI 1812, cloud UI 1814 and/or cloud UI 1816 and place a subscription order via these UIs. The order information received by cloud infrastructure system 1802 in response to the customer placing an order may include information identifying the customer and one or more services offered by the cloud infrastructure system 1802 that the customer intends to subscribe to.

At 1836, the order information received from the customer may be stored in an order database 1818. If this is a new order, a new record may be created for the order. In one embodiment, order database 1818 can be one of several databases operated by cloud infrastructure system 1818 and operated in conjunction with other system elements.

At 1838, the order information may be forwarded to an order management module 1820 that may be configured to perform billing and accounting functions related to the order, such as verifying the order, and upon verification, booking the order.

At 1840, information regarding the order may be communicated to an order orchestration module 1822 that is configured to orchestrate the provisioning of services and resources for the order placed by the customer. In some instances, order orchestration module 1822 may use the services of order provisioning module 1824 for the provisioning. In certain embodiments, order orchestration module 1822 enables the management of business processes associated with each order and applies business logic to determine whether an order should proceed to provisioning.

As shown in the embodiment depicted in FIG. 18, at 1842, upon receiving an order for a new subscription, order orchestration module 1822 sends a request to order provisioning module 1824 to allocate resources and configure resources needed to fulfill the subscription order. Order provisioning module 1824 enables the allocation of resources for the services ordered by the customer. Order provisioning module 1824 provides a level of abstraction between the cloud services provided by cloud infrastructure system 1800 and the physical implementation layer that is used to provision the resources for providing the requested services. This enables order orchestration module 1822 to be isolated from implementation details, such as whether or not services and resources are actually provisioned on the fly or pre-provisioned and allocated/assigned upon request.

At 1844, once the services and resources are provisioned, a notification may be sent to the subscribing customers indicating that the requested service is now ready for use. In some instance, information (e.g. a link) may be sent to the customer that enables the customer to start using the requested services.

At 1846, a customer's subscription order may be managed and tracked by an order management and monitoring module 1826. In some instances, order management and monitoring module 1826 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 1800 may include an identity management module 1828 that is configured to provide identity services, such as access management and authorization services in cloud infrastructure system 900. In some embodiments, identity management module 1828 may control information about customers who wish to utilize the services provided by cloud infrastructure system 1802. Such information can include information that authenticates the identities of such customers and information that describes which actions those customers are authorized to perform relative to various system resources (e.g., files, directories, applications, communication ports, memory segments, etc.) Identity management module 1828 may also include the management of descriptive information about each customer and about how and by whom that descriptive information can be accessed and modified.

FIG. 19 illustrates an exemplary computer system 1900 that may be used to implement certain components according to some example embodiments. In some embodiments, computer system 1900 may be used to implement any of the various servers and computer systems described above. As shown in FIG. 19, computer system 1900 includes various subsystems including a processing unit 1904 that communicates with a number of peripheral subsystems via a bus subsystem 1902. These peripheral subsystems may include a processing acceleration unit 1906, an I/O subsystem 1908, a storage subsystem 1918 and a communications subsystem 1924. Storage subsystem 1918 may include tangible computer-readable storage media 1922 and a system memory 1910.

Bus subsystem 1902 provides a mechanism for letting the various components and subsystems of computer system 1900 communicate with each other as intended. Although bus subsystem 1902 is shown schematically as a single bus, alternative embodiments of the bus subsystem may utilize multiple buses. Bus subsystem 1902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1904 controls the operation of computer system 1900 and may comprise one or more processing units 1932, 1934, etc. A processing unit may include be one or more processors, including single core or multicore processors, one or more cores of processors, or combinations thereof. In some embodiments, processing subsystem 1904 can include one or more special purpose co-processors such as graphics processors (GPUs), digital signal processors (DSPs), or the like. In some embodiments, some or all of the processing units of processing subsystem 1904 can be implemented using customized circuits, such as application specific integrated circuits (ASICs), or field programmable gate arrays (FPGAs).

In some embodiments, the processing units in processing subsystem 1904 can execute instructions stored in system memory 1910 or on computer readable storage media 1922. In various embodiments, the processing units can execute a variety of programs or code instructions and can maintain multiple concurrently executing programs or processes. At any given time, some or all of the program code to be executed can be resident in system memory 1910 and/or on computer-readable storage media 1922 including potentially on one or more storage devices. Through suitable programming, processing subsystem 1904 can provide various functionalities described above for performing efficient application configuration patching operations.

In certain embodiments, a processing acceleration unit 1906 may be provided for performing customized processing or for off-loading some of the processing performed by processing subsystem 1904 so as to accelerate the overall processing performed by computer system 1900.

I/O subsystem 1908 may include devices and mechanisms for inputting information to computer system 1900 and/or for outputting information from or via computer system 1900. In general, use of the term "input device" is intended to include all possible types of devices and mechanisms for inputting information to computer system 1900. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1918 provides a repository or data store for storing information that is used by computer system 1900. Storage subsystem 1918 provides a tangible non-transitory computer-readable storage medium for storing the basic programming and data constructs that provide the functionality of some embodiments. Software (programs, code modules, instructions) that when executed by processing subsystem 1904 provide the functionality described above may be stored in storage subsystem 1918. The software may be executed by one or more processing units of processing subsystem 1904. Storage subsystem 1918 may also provide a repository for storing data used in accordance with the some example embodiments.

Storage subsystem 1918 may include one or more non-transitory memory devices, including volatile and non-volatile memory devices. As shown in FIG. 19, storage subsystem 1918 includes a system memory 1910 and a computer-readable storage media 1922. System memory 1910 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1900, such as during start-up, may typically be stored in the ROM. The RAM typically contains data and/or program modules that are presently being operated and executed by processing subsystem 1904. In some implementations, system memory 1910 may include multiple different types of memory, such as static random access memory (SRAM) or dynamic random access memory (DRAM).

By way of example, and not limitation, as depicted in FIG. 19, system memory 1910 may store application programs 1912, which may include client applications, Web browsers, mid-tier applications, relational database management systems (RDBMS), etc., program data 1914, and an operating system 1916. By way of example, operating system 1916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1922 may store programming and data constructs that provide the functionality of some embodiments. Software (programs, code modules, instructions) that when executed by processing subsystem 1904 a processor provide the functionality described above may be stored in storage subsystem 1918. By way of example, computer-readable storage media 1922 may include non-volatile memory such as a hard disk drive, a magnetic disk drive, an optical disk drive such as a CD ROM, DVD, a Blu-Ray® disk, or other optical media. Computer-readable storage media 1922 may include, but is not limited to, Zip® drives, flash memory cards, universal serial bus (USB) flash drives, secure digital (SD) cards, DVD disks, digital video tape, and the like. Computer-readable storage media 1922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1922 may provide storage of computer-readable instructions, data structures, program modules, and other data for computer system 1900.

In certain embodiments, storage subsystem 1900 may also include a computer-readable storage media reader 1920 that can further be connected to computer-readable storage media 1922. Together and, optionally, in combination with system memory 1910, computer-readable storage media 1922 may comprehensively represent remote, local, fixed, and/or removable storage devices plus storage media for storing computer-readable information.

In certain embodiments, computer system 1900 may provide support for executing one or more virtual machines. Computer system 1900 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 1900. Accordingly, multiple operating systems may potentially be run concurrently by computer system 1900. Each virtual machine generally runs independently of the other virtual machines.

Communications subsystem 1924 provides an interface to other computer systems and networks. Communications subsystem 1924 serves as an interface for receiving data from and transmitting data to other systems from computer system 1900. For example, communications subsystem 1924 may enable computer system 1900 to establish a communication channel to one or more client devices via the Internet for receiving and sending information from and to the client devices.

Communication subsystem 1924 may support both wired and/or wireless communication protocols. For example, in certain embodiments, communications subsystem 1924 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1924 can provide wired network connectivity (e.g., Ethernet) in addition to or instead of a wireless interface.

Communication subsystem 1924 can receive and transmit data in various forms. For example, in some embodiments, communications subsystem 1924 may receive input communication in the form of structured and/or unstructured data feeds 1926, event streams 1928, event updates 1930, and the like. For example, communications subsystem 1924 may be configured to receive (or send) data feeds 1926 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1924 may be configured to receive data in the form of continuous data streams, which may include event streams 1928 of real-time events and/or event updates 1930, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 1924 may also be configured to output the structured and/or unstructured data feeds 1926, event streams 1928, event updates 1930, and the like to one or more databases that may be in communication with one or more streaming data source computers coupled to computer system 1900.

Computer system 1900 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 1900 depicted in FIG. 19 is intended only as a specific example. Many other configurations having more or fewer components than the system depicted in FIG. 19 are possible. Based on the disclosure and teachings provided herein, a person of ordinary skill in the art will appreciate other ways and/or methods to implement the various embodiments.

Although specific example embodiments have been described, various modifications, alterations, alternative constructions, and equivalents are also encompassed within the scope of the example embodiments. The example embodiments are not restricted to operation within certain specific data processing environments, but are free to operate within a plurality of data processing environments. Additionally, although example embodiments have been described using a particular series of transactions and steps, it should be apparent to those skilled in the art that the scope of the example embodiments are not limited to the described series of transactions and steps. Various features and aspects of the above-described embodiments may be used individually or jointly.

Further, while example embodiments have been described using a particular combination of hardware and software, it should be recognized that other combinations of hardware and software are also within the scope of the example embodiments. The example embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter-process communication (IPC), and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific example embodiments have been described, these are not intended to be limiting. Various modifications and equivalents are within the scope of the following claims.

What is claimed is:

1. A method for changing an integration flow of an integration system, the method comprising:
    receiving a request from a first activity of a plurality of activities in the integration flow displayed on a user interface, wherein the request comprises a first change to a first parameter in the first activity of the integration flow;
    identifying a second activity from the plurality of activities in the integration flow displayed on the user interface that is affected by the first change to the first parameter in the first activity;
    applying a second change to second parameter in the second activity from the plurality of activities in the integration flow displayed on the user interface based on the first change to the first parameter in the first activity; and
    validating the second activity.

2. The method according to claim 1, wherein the identifying the second activity comprises:
    registering the first change to the first parameter in a changed activity register;
    determining whether the second activity from the plurality of activities is affected by the first change registered in the changed activity register; and
    in response to the second activity being affected by the first change, registering the second change to the second parameter in the changed activity register.

3. The method according to claim 2, wherein the determining whether the second activity from the plurality of activities is affected by the first change comprises determining whether the second parameter of the second activity is dependent on the first parameter in the first activity.

4. The method according to claim 2, further comprising, prior to applying the second change to second data, identifying a third activity from the plurality of activities affected by one of the first change to the first parameter in the first activity and the second change to the second parameter in the second activity; and
    registering a third change to the changed activity register.

5. The method according to claim 1, further comprising:
    after applying the second change to the second parameter, receiving a request to register the second activity in a change validation register; and
    registering the second activity in the change validation register.

6. The method according to claim 5, wherein the validating the second activity comprises:
    identifying the second activity registered in the change validation register; and
    determining whether the second activity is consistent with the integration flow.

7. The method according to claim 6, wherein in response to the second activity not being consistent with the integration flow, providing one of an error or a warning to a user.

8. The method according to claim 7, wherein the one of the error or the warning is displayed adjacent to the second activity.

9. The method according to claim 1, wherein the first activity comprises one of a source application, a target application, and an action.

10. The method according to claim 1, wherein the integration flow comprises a source application, a target application, and an action.

11. The method according to claim 9, wherein the action comprises one of assign, callback, fault return, for each, function call, logger, map, notification, raise error, return, scope, stage file, switch, stop, wait, and while.

12. The method according to claim 1, further comprising:
    in response to receiving the request from the first activity, obtaining a previous configuration value of the first activity;
    creating system artifacts for the first activity, wherein the system artifacts comprise updated configuration values of the first activity corresponding to the first change in the request;
    analyzing the updated configuration values; and
    assigning a level of impact to the updated configuration values.

13. The method according to claim 12, wherein the level of impact comprises one of a major level of impact and a minor level of impact.

14. The method according to claim 13, wherein the major level of impact is assigned to updated configuration values corresponding to one of an application message exchange pattern change, a root element name change of a request input, a root element namespace change of a request output, a root element name change of a response input, and a root element namespace change of a response output.

15. The method according to claim 12, wherein the first activity is one of a source application and a target application.

16. A non-transitory computer readable storage medium storing instructions which, when executed by one or more processors of a computing device, cause the one or more processors to perform a method comprising:
    receiving a request from a first activity of a plurality of activities in an integration flow displayed on a user interface, wherein the request comprises a first change to a first parameter in the first activity of the integration flow;
    identifying a second activity from the plurality of activities in the integration flow displayed on the user interface that is affected by the first change to the first parameter in the first activity;
    applying a second change to second parameter in the second activity from the plurality of activities in the integration flow displayed on the user interface based on the first change to the first parameter in the first activity; and
    validating the second activity.

17. The non-transitory computer readable storage medium according to claim 16, wherein the identifying the second activity comprises:
    registering the first change to the first parameter in a changed activity register;
    determining whether the second activity from the plurality of activities is affected by the first change registered in the changed activity register; and
    in response to the second activity being affected by the first change, registering the second change to the second parameter in the changed activity register.

18. The non-transitory computer readable storage medium according to claim 17, wherein the determining whether the second activity from the plurality of activities is affected by the first change comprises determining whether the second parameter of the second activity is dependent on the first parameter in the first activity.

19. A computing device, comprising:
a memory; and
one or more processors configured to:
 receive a request from a first activity of a plurality of activities in an integration flow displayed on a user interface, wherein the request comprises a first change to a first parameter in the first activity of the integration flow;
 identify a second activity from the plurality of activities in the integration flow displayed on the user interface that is affected by the first change to the first parameter in the first activity;
 apply a second change to second parameter in the second activity from the plurality of activities in the integration flow displayed on the user interface based on the first change to the first parameter in the first activity; and
 validate the second activity.

20. The computing device according to claim 19, wherein the identifying the second activity comprises:
 registering the first change to the first parameter in a changed activity register;
 determining whether the second activity from the plurality of activities is affected by the first change registered in the changed activity register; and
 in response to the second activity being affected by the first change, registering the second change to the second parameter in the changed activity register.

* * * * *